United States Patent
Nam et al.

(10) Patent No.: US 11,068,504 B2
(45) Date of Patent: Jul. 20, 2021

(54) RELATIONAL DATABASE STORAGE SYSTEM AND METHOD FOR SUPPORTING FAST QUERY PROCESSING WITH LOW DATA REDUNDANCY, AND METHOD FOR QUERY PROCESSING BASED ON THE RELATIONAL DATABASE STORAGE METHOD

(71) Applicant: DAEGU GYEONGBUK INSTITUTE OF SCIENCE AND TECHNOLOGY, Daegu (KR)

(72) Inventors: Yoon Min Nam, Daegu (KR); Dong Hyoung Han, Daegu (KR); Min Soo Kim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 271 days.

(21) Appl. No.: 16/327,274

(22) PCT Filed: Jan. 11, 2017

(86) PCT No.: PCT/KR2017/000346
§ 371 (c)(1),
(2) Date: Feb. 21, 2019

(87) PCT Pub. No.: WO2018/043843
PCT Pub. Date: Mar. 8, 2018

(65) Prior Publication Data
US 2019/0179832 A1    Jun. 13, 2019

(30) Foreign Application Priority Data

Aug. 31, 2016 (KR) .................. 10-2016-0112065
Dec. 23, 2016 (KR) .................. 10-2016-0178421

(51) Int. Cl.
*G06F 16/27* (2019.01)
*G06F 16/2455* (2019.01)
(Continued)

(52) U.S. Cl.
CPC ........ *G06F 16/278* (2019.01); *G06F 16/2282* (2019.01); *G06F 16/2456* (2019.01); *G06F 16/24534* (2019.01)

(58) Field of Classification Search
CPC . G06F 16/278; G06F 16/2282; G06F 16/2456
See application file for complete search history.

(56) References Cited

U.S. PATENT DOCUMENTS 5,970,495 A    10/1999  Baru et al.
6,138,111 A *  10/2000  Krishna ............ G06F 16/24544
(Continued)

FOREIGN PATENT DOCUMENTS

KR    20150010694    1/2015
KR    10151304       7/2015

OTHER PUBLICATIONS

WIPO, ISR for PCT/KR2017/000346, dated May 30, 2017.
(Continued)

*Primary Examiner* — Kris E Mackes
(74) *Attorney, Agent, or Firm* — Hauptman Ham, LLP

(57) ABSTRACT

A relational database storage method according to one embodiment generates a join graph including tables and edges based on either a database schema including referential constraints among database tables or a query workload containing a set of join predicates, classifies the type of tables based on the cost of a join operation between the tables included in the join graph, classifies the type of edges in the join graph on the basis of the type of the tables connected to each other by the edge, adds a virtual edge between two tables satisfying the indirect join condition, and (Continued)

generates a database partitioning scheme for the join graph based on the set of tables in the join graph and their type, the set of edges in the join graph and their type, and virtual edges.

19 Claims, 14 Drawing Sheets

(51) Int. Cl.
*G06F 16/22* (2019.01)
*G06F 16/2453* (2019.01)

(56) References Cited

U.S. PATENT DOCUMENTS

| | | | |
|---|---|---|---|
| 8,086,598 B1* | 12/2011 | Lamb | G06F 16/24544 |
| | | | 707/714 |
| 8,924,426 B2 | 12/2014 | Chattopadhyay et al. | |
| 8,935,232 B2 | 1/2015 | Abadi et al. | |
| 9,031,994 B1 | 5/2015 | Cao et al. | |
| 2011/0035368 A1* | 2/2011 | Cole | G06F 16/24544 |
| | | | 707/714 |
| 2013/0262433 A1* | 10/2013 | Qiu | G06F 16/2456 |
| | | | 707/714 |
| 2015/0347473 A1 | 12/2015 | Duan et al. | |
| 2016/0055205 A1* | 2/2016 | Jonathan | G06F 16/9024 |
| | | | 707/714 |

OTHER PUBLICATIONS

Curino et al., "Schism: a Workload-Driven Approach to Database Replication and Partitioning," Proceedings of the VLDB Endowment, vol. 3, No. 1, Sep. 2010, pp. 48-57.

Kanase et al., "Graph Based Workload Driven Partitioning System for NOSQL Database," Journal of Theoretical and Applied Information Technology, vol. 89, No. 1, Jul. 15, 2016, pp. 85-95.

* cited by examiner

| Symbol | Meaning | Symbol | Meaning |
|---|---|---|---|
| $Cost_{Part}(T)$ | Sum of join processing cost with adjacent table of T when table T is partitioned | pid | Partition index |
| $Cost_{Rep}(T)$ | Sum of join processing cost with adjacent table of T when table T is replicated | pidS | Set of partition index pid(pid $\in$ pidS) |
| t.c | value of column c of tuple t (t $\in$ T) | bitM[pid] | Bitmap table of pid-th partition |
| $E_a$ | Set of intra edge in join graph | bitV | Bitmap vector |
| $E_r$ | Set of inter edge in join graph | $SubP_{bitV}$ | sub partition classified by bitmap vector bitV |
| $E_t$ | Set of indirect edge in join graph | P(T) | Partition set of table T ($\cup_{i=1}^{P} P_i(T)$) |
| $P_i(T)$ | i-th partition of table T | list(t) | List of tuple t |
| C(T) | Partitioning column set of table T | sz(e) | Sum of sizes of two tables at both ends of edge e |
| sz(T) | Size of table T(e) | w(e) | Weight of edge e |
| adj(T) | Adjacent table set of table T | triEdges(e) | Triangle edge set adjacent to edge e |
| K | Maximum number of partitioning columns | P | Number of entire partitions |

Fig. 2

RELATIONAL DATABASE STORAGE SYSTEM AND METHOD FOR SUPPORTING FAST QUERY PROCESSING WITH LOW DATA REDUNDANCY, AND METHOD FOR QUERY PROCESSING BASED ON THE RELATIONAL DATABASE STORAGE METHOD

This application is a U.S. national phase application of International Application No. PCT/KR2017/000346, filed on Jan. 11, 2017, which claims priority to Korean Patent Application No. 10-2016-0112065, filed on Aug. 31, 2016, and to Korean Patent Application No. 10-2016-0178421, filed on Dec. 23, 2016. The entire disclosures of the aforementioned applications are incorporated herein by reference.

FIELD

The technical field relates to a relational database storage system and corresponding method to store database which support a fast query processing with low data redundancy by utilizing a graph based database partitioning scheme and a hash based multi-column table partitioning method and a method for query processing based on the relational database storage method.

BACKGROUND

Since applying database partitioning method reduces an amount of input/output overhead required to process relatively expensive join operations, the database partitioning method has been widely used as a query optimization technique for many query processing systems.

Specifically, in a parallel and distributed query processing system that a set of nodes are connected by a network, an equi-join operation having a specific join condition may be processed without network communication by exploiting a partitioned database. In this case, the specific join condition may refer to the case when a join column for each join table (e.g., R.a for R and S.b for S) included in an equi-join condition (R.a=S.b) is equal to a partitioning column of two tables R and S, i.e., R.a for R and S.b for S.

In the parallel and distributed query processing system, an efficient database partitioning method can eliminate expensive data exchanging among computing machines required for parallel join processing. Because of this advantage, an efficient database partitioning method becomes more and more important in recent years.

The state-of-the-art database partitioning method generates a tree-based database partitioning scheme by utilizing referential constraints and join predicates among tables in the query workload. This database partitioning scheme uses a maximum spanning tree obtained from a schema graph generated from either database schema or query workload. The schema graph is a graph that a node indicates a table and an edge denotes a referential constraint or a join predicate, a label of an edge represents a join condition between two end tables and a weight of an edge means the smaller table size of two end tables.

The database partitioning method based on a maximum spanning tree considers a parent-child relationship between two adjacent tables R and S in the tree. To partition a child table S, this method references all P partitions of a parent table R. When i-th partition of R has a tuple r having the same partitioning column value as the tuple s of the child table, such tuple s is stored to its i-th partition. Here, depending on the number of matching partitions of the parent table, the tuple s in the child table S may be duplicated across the partitions.

However, this tree-based partitioning method has following issues:

First, this partitioning method references a set of partitions of a parent table in order to partition a child table. Therefore, it causes data dependency between two tables having a parent-child relationship, and at the same time, the number of accessing parent table during partitioning a child table increases proportionally as the size of database increases. As a result, the performance of data loading is significantly degraded when partitioning a large database.

Second, a huge tuple-level data duplication may be occurred when partitioning a child table depending on the distribution of partitioning column value in a parent table because of the data dependency we discussed in above. That is, the amount of tuple-level duplication increases largely when a child table references a foreign-key column of a parent table because a foreign key column is not a unique column.

Third, as the complexity of a database schema or the number of queries in the workload increase, there may exist either multiple referential constraints or join predicates between two tables.

In this case, when considering the number of referential constraints or join predicates for database partitioning as much as possible, a data locality for a join query under partitioned database can increase. However, tree-based partitioning scheme having data dependency between adjacent tables suffers from a huge data redundancy when either due to the depth of the tree becomes deeper or one or more tree type partitioning schemes may be generated. Moreover, data redundancy of partitioned database may significantly increase as the depth of partitioning tree becomes deeper because data redundancy stems from data dependency between two adjacent tables is increased in a cumulative manner.

Furthermore, tree-based partitioning scheme may generate more than one partitioning tree, and thus the same large table may exist in more than one partitioning tree. However, the same table duplicated across different partitioning trees may reference the same parent table (which the parent table is also duplicated) and also have the same partitioning conditions with their the same parent table. In this case, data locality of partitioned database does not increase despite huge data redundancy, and thus the efficiency of partitioning scheme is degraded significantly.

Fourth, a tree-based partitioning scheme cannot represent a cyclic relationship among tables. In this case, tree-based approach cuts one of edge in a cycle to make it as a tree structure. Thus, data locality among join conditions in the cyclic partitioning relationship may not fully supported. Moreover, as a query becomes complex, more number of such cyclic join operation can be included in the query. Thus, a query performance of such complex query can be degraded largely since tree-based partitioning scheme cannot guarantee the sufficient data locality as we discussed.

Fifth, tree-based partitioning scheme rewrites a query execution plan by adding expensive repartitioning operation to eliminate tuple-level duplication existing in a partitioned database at query runtime. However, duplicated tuples may also be repartitioned across machines via network communication, and then are removed at query runtime to process a join operation correctly. Thus, it causes additional runtime overhead during query processing, and thus query performance can also be degraded.

As described above, an efficient database partitioning method which both improves query performance and reduces data redundancy has not been carefully studied despite of its importance.

DISCLOSURE

Technical Problem

According to an exemplary embodiment, a proposed method can provide an efficient graph-based partitioning scheme in terms of query performance and space overhead by exploiting cost-based analysis based on a graph-based partitioning model despite the complexity of database scheme and query workload increase.

According to an exemplary embodiment, this method generates an efficient database partitioning scheme by hash-partitioning tables based on their specific partitioning columns indicated in the partitioning scheme without having data dependency between tables.

According to an exemplary embodiment, this method can provide both a fast data loading performance and performance scalability by using hash-based table partitioning approach without accessing other tables during table partitioning due to no data dependency.

According to an exemplary embodiment, this method represents partitioning relationship as a multi-graph model which allows to represent cyclic partitioning relationships among tables stem from either multiple referential constraints or multiple join predicates existing among them.

According to an exemplary embodiment, this method may significantly reduce data redundancy of partitioned database by hash partitioning a table on a set of partitioning columns in corresponding partitioning predicates included in a partitioning scheme.

According to an exemplary embodiment, this method can eliminate duplicated tuples during scanning partitioned table by exploiting a bitmap table which is organized as a set of bitmap vectors that represents tuple-level information with regard to tuple duplication.

According to an exemplary embodiment, this method can eliminate tuple duplicates without additional computational overhead during query processing and query rewriting process by using a novel subpartitioning technique based on tuple-level bitmap vector information used in this method.

According to an exemplary embodiment, this method can improve the performance of query processing by scanning only necessary subpartitions of a table that is partitioned by using a subpartitioning technique.

Technical Solution

According to an aspect, a method to store relational database includes generation phase of a join graph based on either database schema including a set of referential constraints or a query workload containing a set of join predicates; classifying a type of each table based on a cost-based analysis of join operation to decide whether partitioning a table or not; classifying types of edges in the join graph, based on types of two end tables; adding a logical edge called indirect join edge between two tables in a join graph when the two end tables satisfy special conditions; and generating a graph-based database partitioning scheme based on types of tables and types of edges including a logical edges included in a join graph.

Retrieving a join graph may include constructing an edge between tables included in the join graph using either referential constraints or join predicates included in query workload.

The classification of types of tables may include the classification of types of tables based on a cost-based analysis of a join operation between two adjacent tables in a join graph.

The classification of types of tables may include calculating a sum of the first type of join operations for a table which is partitioned and then stored in a storage (or memory device) and a sum of the second type of join operations for a table which is replicated across a multiple of slave nodes, based on the information with regard to tables and edges included in a join graph; classifying a type of each table as the one of two types of table based on a comparison between the sum of join operations among the table and its adjacent tables in a join graph by assuming the table as either the first type or the second type of a table; and storing a table to memory device in accordance with the type of the table.

The classification of types of edges may include classifying the type of each edge in a join graph as either an indirect join edge or an intra join edge, based on the types of two end tables of the edge.

The classification of type of an edge to either an intra join edge or an inter join edge may include the determination of the type of edge as an intra join edge when the types of both two end tables of the edge fall into the first type of table; and the determination of the type of edge as an inter join edge when the types of both two end tables of the edge fall into the second type of table.

The step which adds a logical edge to a partitioning scheme may include the verification phase whether a pair of tables that classified as the first type of table satisfies the indirect edge condition or not; and the addition of the logical edge to a pair of the table satisfying the indirect edge condition.

The indirect edge condition may include a first condition that a first table and a second table which are a pair of the first type of tables are connected to the same third table through a first edge of the first table and a second edge of the second table; a second condition that the same column of the third table is included in labels of the first edge and the second edge; and a third condition that a type of the third table is the second type.

The generating of a database partitioning scheme may include calculating a benefit when the join operation is performed by the first type of table using the edges, in accordance with the type of edges; sorting the edges in the order from the large benefit; initializing a partitioning graph with the first type of tables in the join graph as nodes; and updating the partitioning graph by processing the edges in the sorted order.

The types of edges include at least one of an intra edge, an inter edge, and an indirect edge and the calculating of a benefit may include calculating the benefit using different partitioning benefit models in accordance with the types of edges.

The updating of the partitioning graph may include exploring two adjacent triangle edges satisfying a triangle edge condition for an edge in the join graph, based on the database partitioning scheme; exploring a hub table satisfying a hub table condition for an edge in the join graph, based on the database partitioning scheme; and adding the edge, the two triangle edges, and the hub table to the partitioning graph.

The triangle edge condition may include a condition that the type of edge in the join graph is an intra edge; a condition that there are edges of a first type of two tables connected to the intra edge and the edges are connected to the same table; a condition that labels of the edges include a column of the same table; and a condition in which the type of the same table is a second type.

The hub table condition may include a condition that a type of the edge in the join graph is an intra edge or an indirect edge between a first type of two tables and edges of the first type of two tables are edges satisfying the triangle edge condition for columns of one or more common tables classified to be a second type in accordance with the triangle edge condition.

The relational database storing method may further include classifying tuples included the tables on the basis of a hash function, based on the database partitioning scheme; and storing the corresponding tuples in a partition corresponding to the partitioned tuples, based on information related to a partitioning column of the tuple.

The classifying on the basis of a hash may include determining a position of a partition in which the tuple is stored, on the basis of a hash function for all partitioning column values of the tuples; generating a bitmap vector using index information of the corresponding partitioning column in a partitioning column set; and updating bitmap vector information of the tuple to a bitmap table of the table using the bitmap vector.

The storing of the tuple may include generating a bitmap vector set using partitioning column information of a table including a tuple list shuffled for every partition corresponding to each of partitioned tuples; initializing a sub partition for a bitmap vector included in the bitmap vector set; storing each of the tuples in a corresponding sub partition using a bitmap vector corresponding to each tuple included in the tuple list; and constructing a partition of a table including the tuple list by a union of all sub partitions when all tuples included in the tuple list are stored in the sub partition.

According to an aspect, a method of processing a query based on a relational database storing method includes: determining whether a table is used for a join operation in an input query; determining whether an intersection between a first partitioning column set of the table and a second partitioning column set of a table to be joined to the table is a null set through partitioning column information of the table; selecting any one of partitioning columns related to the table, in accordance with a scan mode of the table determined based on the determination; calculating a list of bitmap vectors corresponding to any one selected partitioning column; selecting a sub partition corresponding to at least one bitmap vector included in the list of the bitmap vectors; and scanning the selected sub partition.

The selecting of any one of partition columns may include determining any one of a first scan mode and a second scan mode when the table is read based on the determination; and selecting any one partitioning column of a partitioning column included in the intersection and a partitioning column included in the first partitioning column set, in accordance with any one of scan modes.

Technical Effect

According to an aspect, it is possible to reduce data duplication for a database schema and an input query set having a very complex relationship between the number of tables and the tables through a graph based database partitioning scheme and improve a query processing performance.

According to an aspect, a graph theory such as triangle edge exploration is utilized so that a database partitioning scheme having low data redundancy may be generated while guaranteeing a data locality for processing a query including a cyclic reference relationship and a cyclic join relationship between tables in an input schema or a query set as much as possible.

According to an aspect, simultaneously, the scan operation is performed on the node and the duplication is independently removed without performing a rewriting process of a query for adding a repartitioning process to remove duplication at the time of processing the query which uses a partition including a duplicated tuple by the sub partitioning.

According to an aspect, a data dependency problem existing between tables having a parent-child relationship in a tree structure may be suppressed by using a tuple level hash based partitioning method utilizing partitioning column information included in a database partitioning scheme of a graph structure.

According to an aspect, degradation of a data loading performance due to a partition reference operation at the time of loading data is solved and the overlapping of data duplication may be prevented using a tuple level hash based partitioning method utilizing partitioning column information included in a database partitioning scheme of a graph structure.

BRIEF DESCRIPTION OF THE DRAWINGS

FIG. 2 is a view illustrating a table representing symbols used in exemplary embodiments and meanings of the symbols.

DETAILED DESCRIPTION

Optimum Embodiments

Figure 1:
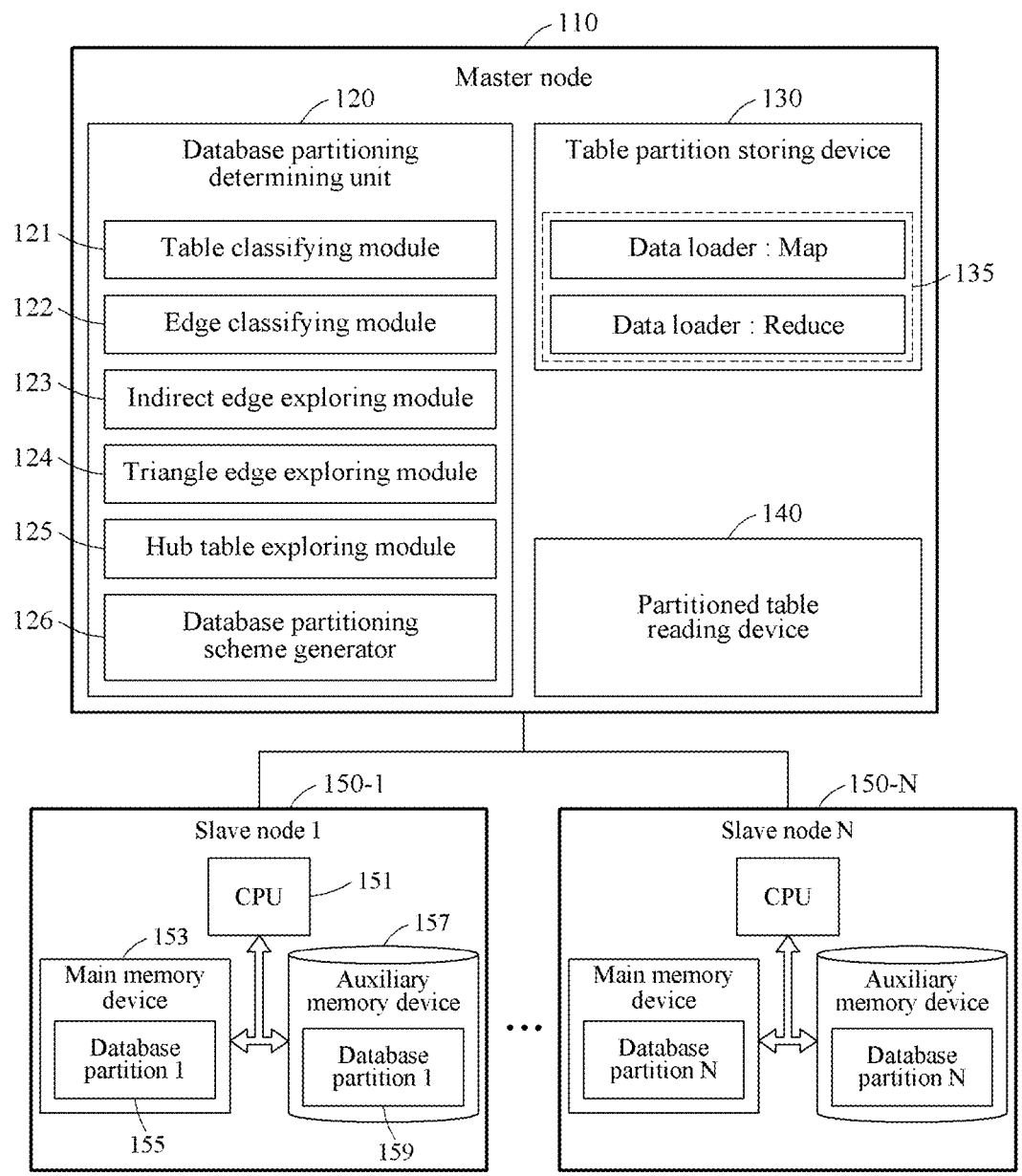
FIG. 1 is a view illustrating a structure of a relational database storage system according to an exemplary embodiment.

Hereinafter, exemplary embodiments will be described in detail with reference to the accompanying drawings. However, the scope of the patent application will be not limited or restricted to embodiments below. In each of the drawings, like reference numerals denote like elements.

Exemplary embodiments described below may be modified in various ways. It should be understood that exemplary embodiments to be described below are not intended to limit the examples, but include all changes, equivalents, and alternatives to them.

Terms used in the exemplary embodiment are used only to describe a specific exemplary embodiment, but are not intended to limit the exemplary embodiment. A singular form may include a plural form if there is no clearly opposite meaning in the context. In this specification, it should be understood that terminology "include" or "have" indicates that a feature, a number, a step, an operation, a component, a part or a combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In description with reference to accompanying drawings, the same components are denoted by the same reference numerals regardless of the reference numeral and a duplicated description thereof will be omitted. In description of an exemplary embodiment, if it is determined that detailed description for a related art may unnecessarily blur the gist of the exemplary embodiment, the detailed description will be omitted.

FIG. 1 is a view illustrating a structure of a relational database storage system according to an exemplary embodiment. Referring to FIG. 1, a relational database storage system according to an exemplary embodiment includes a master node 110 and N slave nodes 150-1, ..., 150-N. The master node 110 and N slave nodes 150-1, ..., 150-N may be configured as a cluster connected through a network.

The master node 110 may include a database partitioning determining unit 120, a table partition storing device 130, and a partitioned table reading device 140.

The database partitioning determining unit 120 may include a table classifying module 121, an edge classifying module 122, an indirect edge exploring module 123, a triangle edge exploring module 124, a hub table exploring module 125, and a database partitioning scheme generator 126. An operation of the database partitioning determining unit 120 will be described with reference to FIGS. 3 to 9.

The table partition storing device 130 may include a data loader 135. The data loader 135 may perform a map operation and a reduce operation. An operation of the data loader 135 will be described with reference to FIGS. 10 to 13.

The partitioned table reading device 140 may read a relational database storing method based query to process the query. An operation of the partitioned table reading device 140 will be described with reference to FIG. 14.

Each slave node 150 includes a CPU 151, a main memory device 153, and an auxiliary memory device 157. The main memory device 153 and the auxiliary memory device 157 may store database partitions 1 155 and 159 corresponding to slave nodes.

In the slave nodes 150, database partitions partitioned by N may be distributed such that one partition is stored for each slave node. The database partition may be stored in both the main memory device 153 and the auxiliary memory device 157 of each slave node. For example, in the case of an in-memory query processing system, the CPU 151 may process the query using the database partition 155 stored in the main memory device 153. Further, in the case of a disk-based query processing system, the CPU 151 may process the query using the database partition 159 stored in the auxiliary memory device 157.

Symbols and meanings of the symbols used in the following exemplary embodiments will be described with reference to a table illustrated in FIG. 2.

Figure 3:
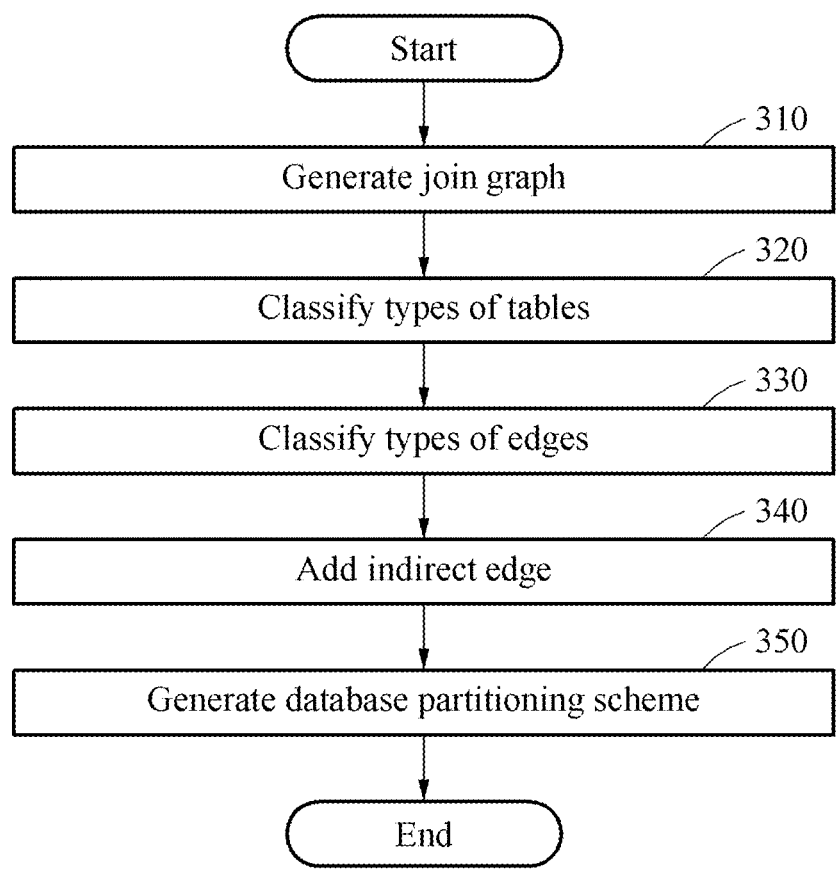
FIG. 3 is a flowchart illustrating a relational database storing method according to an exemplary embodiment.

FIG. 3 is a flowchart illustrating a relational database storing method according to an exemplary embodiment. Referring to FIG. 3, a method that (the database partitioning determining unit 120 of) the master node 110 illustrated in FIG. 1 generates a database partitioning scheme is illustrated.

The master node generates a join graph including tables and edges based on a database schema including information on referential constraint condition between database tables and a query set including join predicate information in step 310. The information on the referential constraint condition between the database tables may also be referred to as a "referential constraint relation information."

For example, the database schema may define a data entity, an attribute, a relationship which configure the database and a constraint condition of data values at the time of the data manipulation.

The master node configures a table (a database table) for a database schema or an input query set given as inputs with a node of the join graph.

The master node may configure an edge between tables included in the join graph using at least one of the referential constraint relation information and the join predicate information.

When the database schema is given as an input, the master node may configure the edge between tables of the join graph by utilizing the referential constraint relation information between two tables included in the database schema. Alternatively, when the query set is given as an input, the master node may configure the edge between the tables in the join graph by utilizing the join predicate information included in the query of the query set. In this case, a label of the edge may be configured by utilizing partitioning column information of two tables connected to both ends of the edge. In a referential constraint relation, a reference-referenced relationship may be considered as an equi-join predicate. For example, when the database schema is given as an input, the master node may set weights of all edges to be "1". Alternatively, when the query set is given as an input, the master node may set a frequency with which a join predicate is included in the query of the query set as a weight of the edge.

The master node may classify types of tables based on a cost of the join operation between tables included in the join graph in step 320. The master node may classify the type of the tables based on the cost of the join operation between a table in the join graph and adjacent tables adjacent to the table. The cost of the join operation may be calculated, for example, by a cost model of the join operation. The cost model of the join operation may be defined by a sum of scan costs of join tables generated at the time of processing the join operation.

The master node may calculate a sum of first join operation costs when the table is partitioned and stored in the memory device and a sum of second join operation costs when the table is replicated in a plurality of slave nodes, based on the set information of the table and the adjacent tables. The master node may classify a type of the table as any one of a first type and a second type in accordance with a result of comparing the sum of the first join operation costs and the sum of the second join operation costs and store the table in accordance with a classified type of table. The first type is, for example, a "Part-table(table to be partitioned)" type and the second type is, for example, a "Rep-table(table to be replicated)" type. A method of classifying the types of tables by the master node will be described in detail with reference to FIG. 4.

The master node classifies the type of edges in the join graph based on the types of tables connected to each other by the edge in step 330. The master node may classify the type of each of the edges as any one of an inter edge and an intra edge, based on the type of the tables connected to each other by the edge. A method of classifying the type of edges by the master node will be described in detail with reference to FIG. 5.

The master node may add a virtual edge between two tables which satisfy an indirect edge condition in the join graph in step 340. The indirect edge condition and the method of adding a virtual edge by a master node will be described with reference to FIG. 6.

The master node generates a database partitioning scheme for the join graph based on the type of edges including the virtual edge in step 350. The master node calculates a benefit when the join operation is performed by the first type of table using edges in accordance with types of edges and sorts the edges in the order from the large benefit.

The master node may initialize the partitioning graph with the first type of tables in the join graph as nodes. The master node may process the edges in the sorted order to update the partitioning graph. The method of generating a database partitioning scheme by the master node will be described in detail with reference to FIG. 7.

Figure 4:
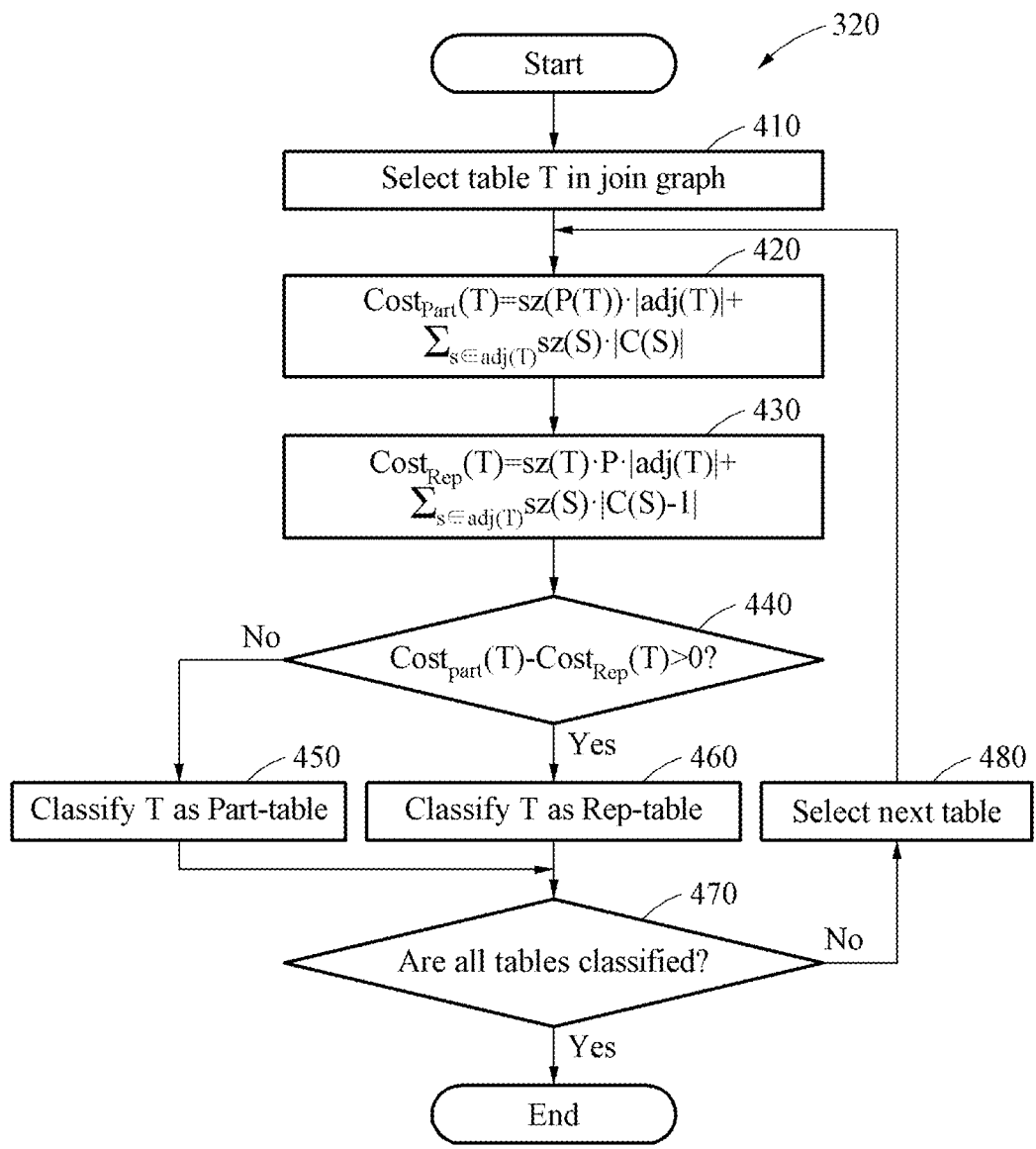
FIG. 4 is a flowchart illustrating a method of classifying types of tables according to an exemplary embodiment.

FIG. 4 is a flowchart illustrating a method of classifying types of tables according to an exemplary embodiment. Referring to FIG. 4, a method that (the table classifying module 121 of) the master node 110 illustrated in FIG. 1 classifies a type of table is illustrated.

The master node may select a table T in the join graph in step 410.

When the table T is partitioned and stored in the memory device, the master node may calculate a sum of the first join operation costs of the table T and adjacent tables adjacent to the table T, based on the set information of the table T and adjacent tables adjacent to the table T in step 420.

In step 420, when the table T is partitioned and stored in the memory device, in other words, when the table T is a Part-table type, the sum of the first join operation costs may be calculated by the join processing cost model CostPart(T).

The join processing cost model CostPart(T) may be defined by a sum $\Sigma_{SCadj(T)} sz(S) \cdot |C(S)|$ of a scan cost $sz(P(T)) \cdot |adj(T)|$ of partitioned table generated when the partitioned table T joins to all adjacent tables and a scan cost of all tables in a set adj(T) of the adjacent tables of the table T. In this case, the cost model of the join operation according to the type of table may be defined by a sum of scan costs of join tables generated at the time of processing the join.

When the table T is replicated into N slave nodes, that is, when the table T is a Rep-table type, the master node may calculate a sum of the second join operation costs of the table T and adjacent tables adjacent to the table T, based on the set information of the table T and adjacent tables adjacent to the table T in step 430.

In step 430, when the table T is replicated into N slave nodes, in other words, when the table T is a Rep-table type, the sum of the second join operation costs may be calculated by the join processing cost model CostRep(T).

The join processing cost model CostRep(T) may be defined by a sum $sz(T) \cdot P \cdot |adj(T)|$ of a table scan costs generated when the table T is replicated into P partitions and joins to all adjacent tables and a sum $\Sigma_{SCadj(T)} sz(S) \cdot |X(S)-1|$ all scan costs of all tables in a set adj(T) of adjacent tables of the table T. Here, the reason why the number of partitioning columns of adjacent tables is reduced by one is because the table T is replicated so that even though the adjacent tables are subjected to the query processing using any column of the table T, the data locality is ensured.

The master node may compare the difference between the sum CostPart(T) of the first join operation costs and the sum CostRep(T) of the second join operation costs in step 440.

As a comparison result of step 440, when the sum of the first join costs is smaller than the sum of the second join costs, the master node may classify the type of the table as a "Part-table" in step 450. The master node may partition and store the corresponding table.

As a comparison result of step 440, when the sum of the first join costs is equal to or larger than the sum of the second join costs, the master node may classify the type of the table as a "Rep-table" in step 460. The master node may replicate the corresponding table into N slave nodes.

The master node may confirm whether all tables are classified in step 470. As a confirmation result of step 470, when all tables are not classified, the master node selects a next table in step 480 and performs steps 420 to 470 on the next table.

As a confirmation result of step 470, when all tables are classified, the master node may end the operation.

Figure 5:
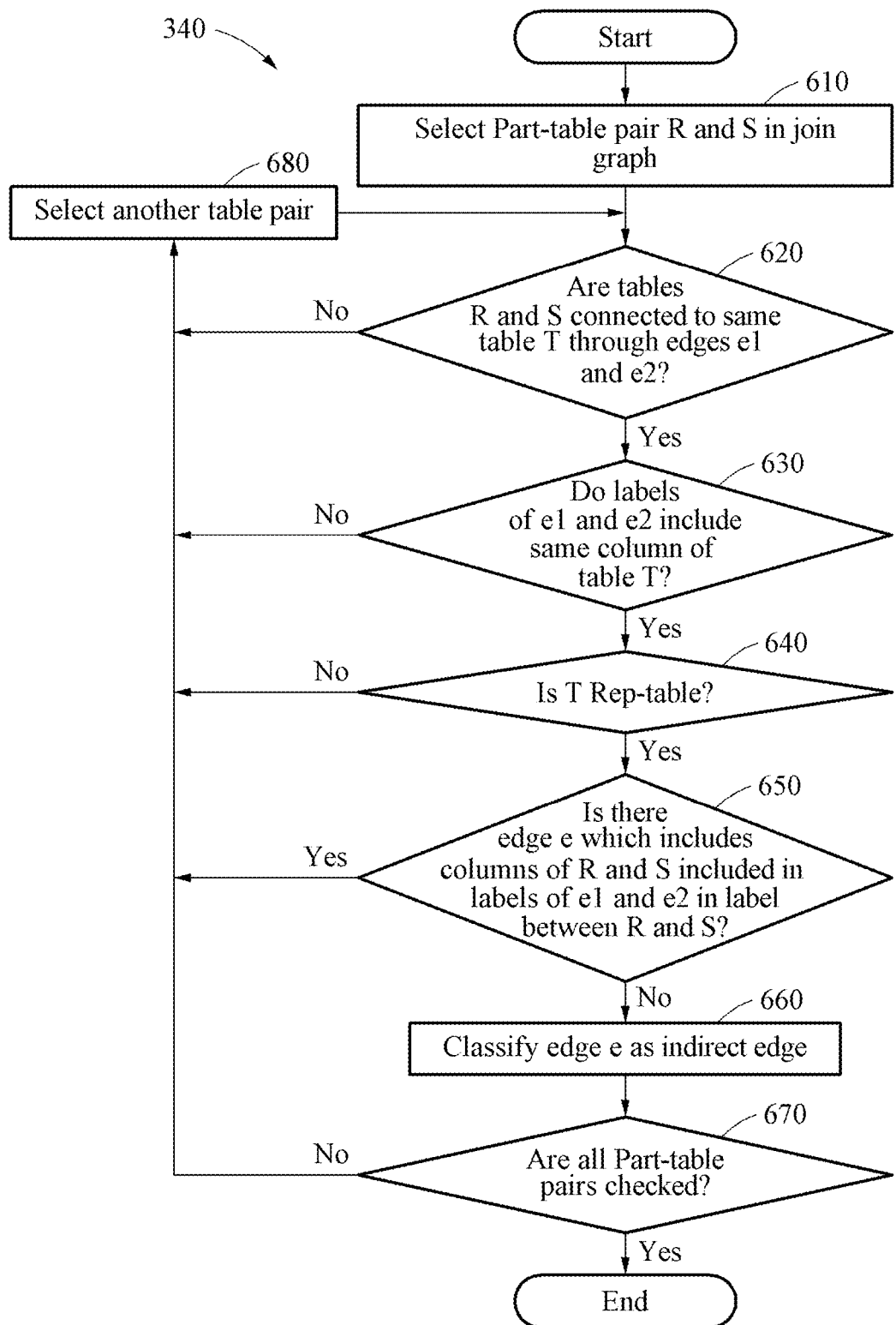
FIG. 5 is a flowchart illustrating a method of classifying types of edges according to an exemplary embodiment.

FIG. 5 is a flowchart illustrating a method of classifying types of edges according to an exemplary embodiment. Referring to FIG. 5, a method that (the edge classifying module 122 of) the master node 110 illustrated in FIG. 1 classifies a type of edge is illustrated.

The master node may select an edge e in the join graph in step 510.

The master node may determine whether the type of all tables at both ends of the edge e, that is, the type of tables connected to each other by the edge is the Rep-table in step 520. In step 520, when it is determined that the type of all tables is the Rep-table type, the master node confirms whether all edges are classified and ends the operation in step 560.

As a determination result of step 520, when the types of tables connected to each other by the edge e are not Rep-table, the master node may determine whether the type of all tables is the Part-table in step 530.

In step 530, when any one of tables connected to each other by the edge is a Rep-table type and the other one is a Part-table type, the master node may classify (determine) the type of edge as an inter-edge in step 540.

In step 530, when the types of all the tables connected to each other by the edge are the Part-table type, the master node may classify (determine) the type of the edge e as an intra edge in step 550.

The master node may confirm whether all edges are classified in step 560. When all the edges are not classified in step 560, the master node may select a next edge to perform steps 520 to 560.

When all the edges are classified in step 560, the master node may end the operation.

Figure 6:
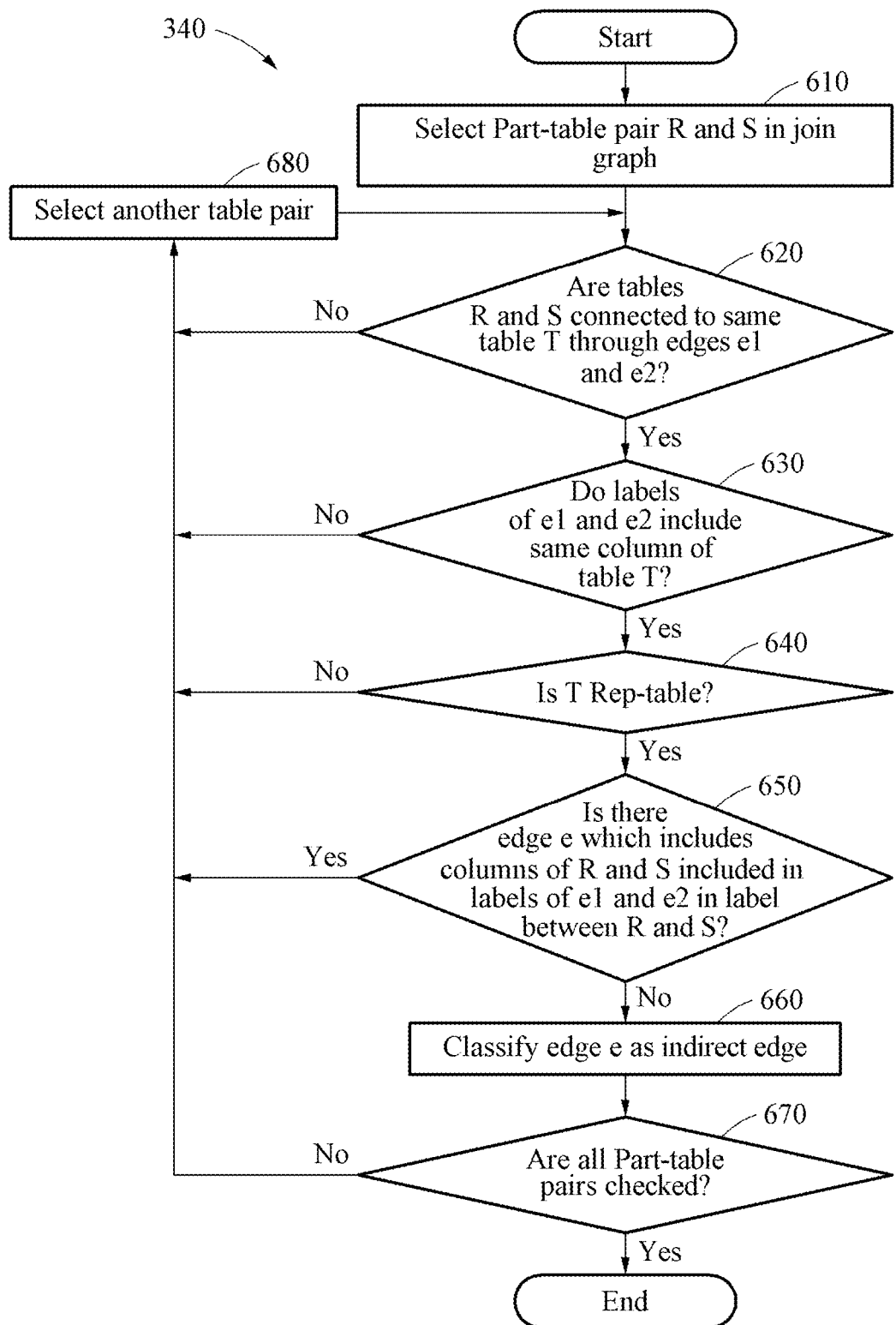
FIG. 6 is a flowchart illustrating a method of adding a virtual edge according to an exemplary embodiment.

FIG. 6 is a flowchart illustrating a method of adding a virtual edge according to an exemplary embodiment. Referring to FIG. 6, a method that (the indirect edge exploring module 123 of) the master node 110 illustrated in FIG. 1 explores a virtual edge is illustrated.

The master node checks whether a pair of all the first type of tables (Part-tables) included in the join graph satisfies an indirect edge condition and adds a virtual edge between the pair of Part-tables satisfying the indirect edge condition. Whether the pair of Part-tables satisfies the indirect edge condition may be identified through steps 620 to 650 illustrated in FIG. 6.

The master node may select a table pair <R, S> of a Part-table type included in the join graph in step 610.

The master node may determine whether the table R and the table S configuring the table pair are connected to the same table T through an edge e1 of the table R and an edge e2 of the table S in step 620.

As a determination result of step 620, when it is determined that the table R and the table S are connected to the table T through the edge e1 and the edge e2, the master node may confirm whether the same column of the table T is included in a label of the edge e1 and a label of the edge e2 in step 630.

When the same column of the table T is included in the label of the edge e1 and the label of the edge e2 in step 630, the master node may identify whether a type of the table T is the Rep-table in step 640.

When it is identified that the type of the table T is the Rep-table in step 640, the master node may identify whether an edge e which includes a column of the table R and the table S included in the labels of the edge 1 and edge 2 in a label exists between the table R and the table S, with respect to the edges e1 and e2 of the table R and the table S satisfying all the steps 620 to 640 in step 650.

In step 650, when the edge e does not exist between the table R and the table S, the master node may classify the edge e as an indirect edge in step 660. In step 660, the master node may add a virtual edge between the table R and the table S having columns of the table R and the table S included in the labels of the edge e1 and the edge e2 as a label.

In steps 620 to 650, when it is identified that the determination result for the corresponding condition is no, the master node selects another table pair in step 680 and performs the process of steps 620 to 670 on another table pair.

The master node may determine whether to confirm the pair of all Part-tables in the join graph in step 670. When the pair of all Part-tables is not confirmed in step 670, the master node selects another Part-table pair in step 680 and performs the process of steps S620 to 670 on the other Part-table pair.

When all the pairs of Part-tables are confirmed in step 670, the master node may end the operation.

Figure 7:
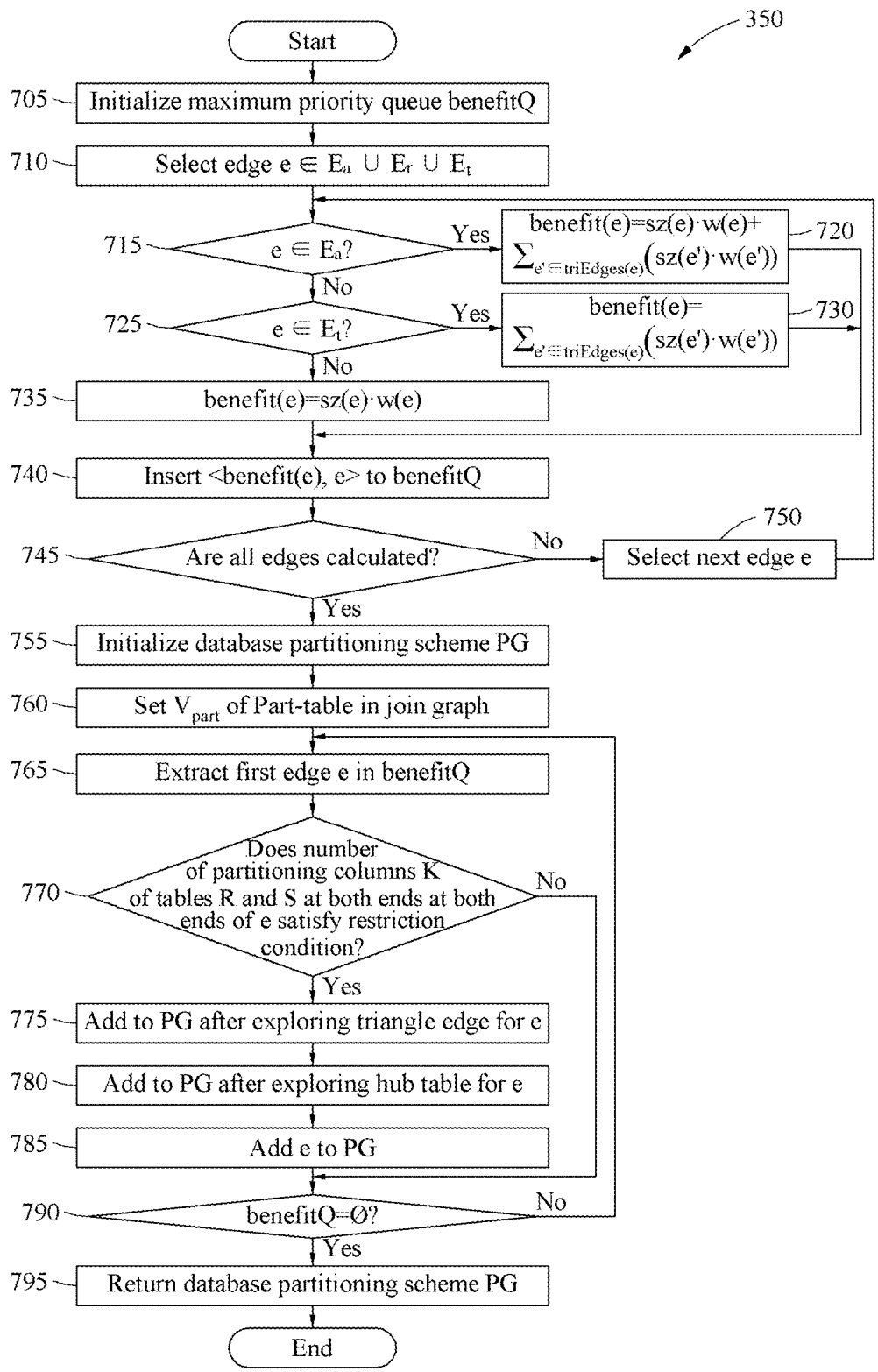
FIG. 7 is a flowchart illustrating a method of generating a database partitioning scheme according to an exemplary embodiment.

FIG. 7 is a flowchart illustrating a method of generating a database partitioning scheme according to an exemplary embodiment. Referring to FIG. 7, a method that (the database partitioning scheme generator 126 of) the master node 110 illustrated in FIG. 1 generates a database partitioning scheme is illustrated.

The master node may initialize a max-priority queue benefitQ in step 705.

The master node may select any one edge e included in a union of an intra edge, an inter edge, and an indirect edge which are an operation result of the edge classifying module 122 and the indirect edge exploring module 123 which have been described with reference to FIGS. 5 and 6 in step 710.

The master node may calculate a partitioning benefit benefit(e) using a partitioning benefit model in accordance with the edge type of the edge e. The partitioning benefit model is obtained by modeling a benefit of a processing cost of the join operation which may be obtained by partitioning the table using a given edge e in terms of table scan cost. In other words, the partitioning benefit model is obtained by quantifying a benefit obtained by locally processing the join operation corresponding to the given edge using a table partitioned utilizing an edge in terms of table scan. Therefore, the larger the sum of sizes of tables at both ends of the edge and the larger the weight of the edge, in other words, the higher the frequency of the join operation for the corresponding edge, the larger the benefit obtained by partitioning the table utilizing the corresponding edge. Hereinafter, a partitioning benefit model in according to three edge types will be described with reference to steps 715 to 735.

The master node may determine whether the edge type of the edge e is an intra edge Ea in step 715. As a determination result of step 715, when the edge type of the edge e is an intra edge, the master node may model the partitioning benefit model using partitioning column information of the edge e and the edges in a triangle edge set triEdges(e) included in tables at both ends of the edge e in step 720. In this case, when three tables included in the edge are partitioned, the master node may model the partitioning benefit obtained by performing local join processing on the join operation corresponding to the edge e and the triangle edges. The triangle edge set triEdges(e) may be obtained through the triangle edge exploring module 124 illustrated in FIG. 1.

In step 720, the partitioning benefit of the edge e may be calculated by $sz(e)*w(e)$. Further, the partitioning benefit for an edge e' included in the triangle edge set may be a sum of $sz(e')*w(e')$ values for ($e' \in triEdges(e)$). The master node may use $sz(e)*w(e)+sz(e')*w(e')$ corresponding to the sum of two calculated values as a partitioning benefit model of the intra edge. The master node may map the benefit benefit(e) calculated through the partitioning benefit model according to the edge type (intra edge (Ea)) to the edge e and then add (insert) the benefit to the max-priority queue benefitQ in step 740.

As the determination result of step 715, when the edge type of the edge e is not an intra edge, the master node may determine whether the edge type of the edge e is an indirect edge Et in step 725.

In step 725, when it is determined that the edge type of edge e is an indirect edge Et, the master node may model the partitioning benefit model of the indirect edge by the sum of the partitioning benefits of the triangle edges which are findable from the indirect edge e in step 730. In this case, the reason why the indirect edge itself is not included in the partitioning benefit model is because the indirect edge is not actually present. If the edge e is not the indirect edge, but an edge which is actually present in the join graph, the edge may be classified as an intra edge type by the edge classifying module 122.

Therefore, in step 730, the partitioning benefit model for the indirect edge e may be calculated by the sum of sz(e')*w(e') for the triangle edge e' included in the triangle edge set triEdges(e). The master node may map the benefit benefit(e) calculated through the partitioning benefit model according to the edge type (indirect edge (Et)) to the edge e and then add (insert) the benefit to the max-priority queue benefitQ in step 740.

In step 725, when it is determined that the edge type of edge e is not an indirect edge, the master node may determine the type of edge to be an inter edge and determine a partitioning benefit model of the inter edge in step 735. In step 735, the partitioning benefit model of the inter edge may be configured by the partitioning benefit of the intra edge. In this case, the reason why the indirect edge is not included in the partitioning benefit model of the inter edge is because a type of any one of tables at both ends of the edge is a Part-table and a type of the other one table is a Rep-table in accordance with the definition of the intra edge so that the triangle edge condition is not satisfied. Therefore, the partitioning benefit model of the inter edge may be calculated by sz(e)*w(e).

The master node may map the benefit benefit(e) calculated through the partitioning benefit model according to each edge type to the edge e and then add (insert) the benefit to the max-priority queue benefitQ in step 740.

The master node may confirm whether mapping information of all edges in the union of edges and partitioning benefits is added to the max-priority queue benefitQ in step 745.

As a confirmation result of step 745, when the mapping information of all the edges in the union of edges and partitioning benefits is not added to the max-priority queue benefitQ, the master node selects a next edge in step 750 and performs the process of steps 715 to 750 for the next edge.

As the confirmation result of step 745, when the mapping information of all the edges in the union of edges and partitioning benefits is added to the max-priority queue benefitQ, the master node may initialize a partitioning graph PG which is an advanced partitioning result graph to generate a database partitioning scheme using the max-priority queue benefitQ in step 755.

The master node may select a table set Vpart of a Part-table type in the join graph in step 760. The master node may generate a partitioning graph for the database partitioning scheme using the table set Vpart.

The master node may extract a first edge e in the max-priority queue benefitQ which is an edge bringing the maximum partitioning benefit among edges of the join graph in step 765. In step 765, the master node extracts the first edge e and then removes the first edge e from the max-priority queue benefitQ. Thereafter, the max-priority queue benefitQ may be sorted such that an edge with the most partitioning benefit next to the removed first edge e becomes the first edge.

The master node may confirm whether the maximum number K of partitioning columns of the table R and the table S at both ends of the edge e extracted in step 765 satisfies a predetermined constraint condition in step 770. In this case, the predetermined constraint condition may be configured by four conditions as follows:

A first condition is $|C(R)|<k \wedge |C(S)|<k$, second and third conditions are $|C(R)|=k \wedge |C(S)|<k$ or $|C(R)|<k \wedge |C(S)|=k$. In this case, it is determined whether to satisfy the constraint condition depending on whether the partitioning column included in a label function of the edge and each partitioning column set intersects with each other. To be more specific, when it is assumed that the partitioning columns of the table R and the table S included in the label of the edge e are R.c and S.c, respectively, in the second condition, the constraint condition is satisfied in the case of $R.c \in C(R)$ and in the third condition, the constraint condition may be satisfied in the case of $S.c \in C(S)$.

In the last condition $|(R)|=k \wedge |C(S)|=k$, when both tables R and S are $R.c \in C(R) \wedge S.C \in C(S)$, the constraint condition is satisfied.

When the edge e in the join graph extracted in step 765 satisfies the constraint condition of the maximum number of partitioning columns, the master node may explore two adjacent triangle edges which satisfy the triangle edge condition for the edge e and then add the triangle edge to the partitioning graph PG in step 775. A method of exploring two adjacent triangle edges which satisfy the triangle edge condition by the master node will be described with reference to FIG. 8.

After exploring a hub table for the edge e in the join graph extracted in step 765, the master node may add the explored hub table to the partitioning graph PG in step 780. In step 780, the master node may explore one or more tables in the join graph corresponding to the extracted edge e and classify a table satisfying a hub table condition among the explored tables as a hub table type. A method of exploring a table satisfying a hub table condition for an edge e by the master node will be described with reference to FIG. 9.

The master node may add the edge e to the partitioning graph PG in step 785. The master node may update partitioning column information included in the edge label when the edge e is added to the partitioning graph PG to two tables at both ends of the edge.

The master node may confirm whether the max-priority queue benefitQ is empty in step 790. As a confirmation result of step 790, if the max-priority queue benefitQ is not empty, the master node may repeat the process of steps 765 to 795.

As the confirmation result of step 790, if the max-priority queue benefitQ is empty, the master node may return the database partitioning scheme in step 795 and end the operation. Therefore, in the Part-table type of tables in the returned database partitioning scheme, the maximum number of partitioning columns does not exceed k.

Figure 8:
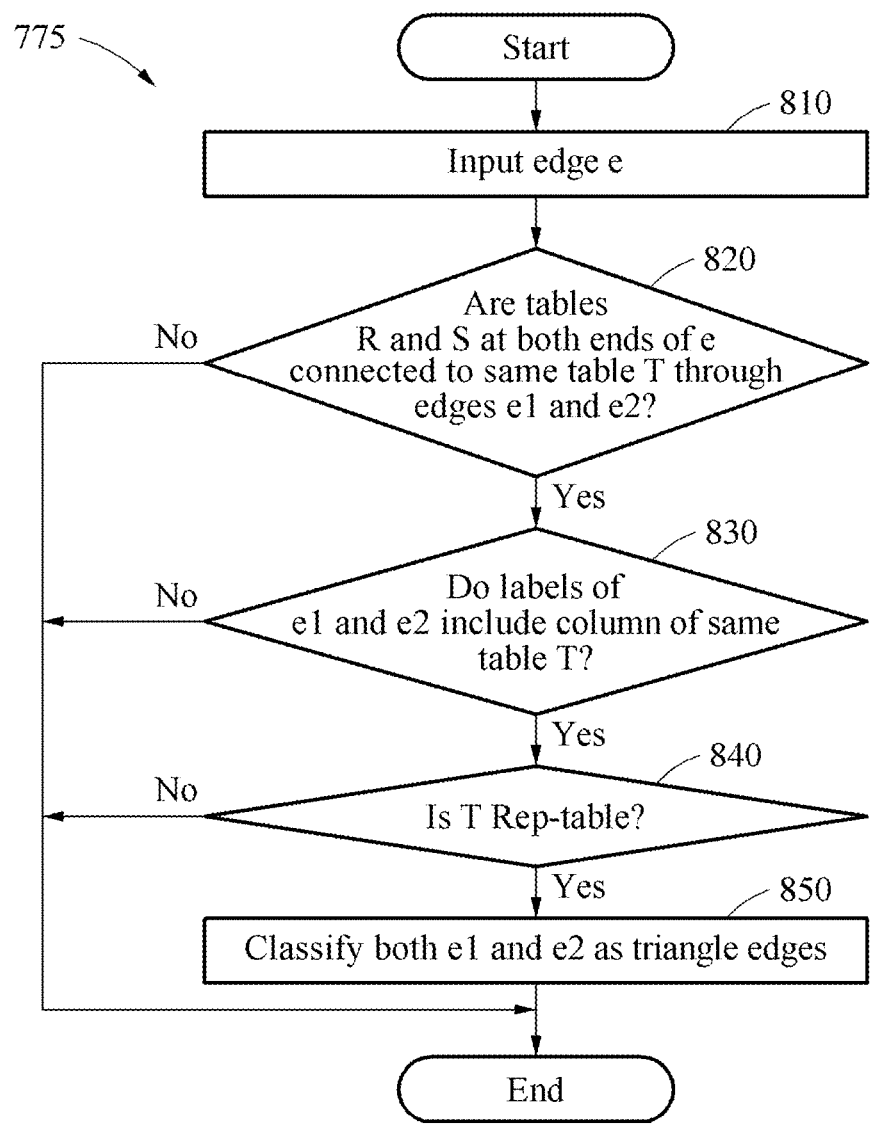
FIG. 8 is a flowchart illustrating a method of exploring a triangle edge according to an exemplary embodiment.

FIG. 8 is a flowchart illustrating a method of exploring a triangle edge according to an exemplary embodiment. Referring to FIG. 8, a process of exploring two edges e1 and e2 satisfying the triangle edge condition of the following steps 820 to 840 by (the triangle edge exploring module 124 of) the master node 110 illustrated in FIG. 1 is illustrated. Edges satisfying the triangle edge condition may be added to the partitioning graph.

When the input edge e is input in step 810, the master node may determine whether the type of input edge e is an intra edge type, that is, Part-table type of two tables R and S at both ends of the input edge e are connected to the same table T through the edge e1 and the edge e2 in step 820. As a determination result of step 820, when two tables R and S are not connected to the same table T through the edges e1 and e2, the master node may end the operation.

As the determination result of step 820, when two tables R and S are connected to the same table T through the edges e1 and e2, the master node may determine whether the labels of the edges e1 and e2 include a column of the same table T in step 830. As a determination result of step 830, if the labels of the edges e1 and e2 do not include the column of the same table T, the master node may end the operation.

As the determination result of step 830, when the labels of the edges e1 and e2 include the column of the same table T, the master node may determine whether a type of the table T is the Rep-table in step 840. When it is determined that the type of table T is not the Rep-table in step 840, the master node may end the operation.

When it is determined that the type of table T is the Rep-table in step 840, the master node may classify the edges e1 and e2 as a triangle edge type in step 850.

Figure 9:
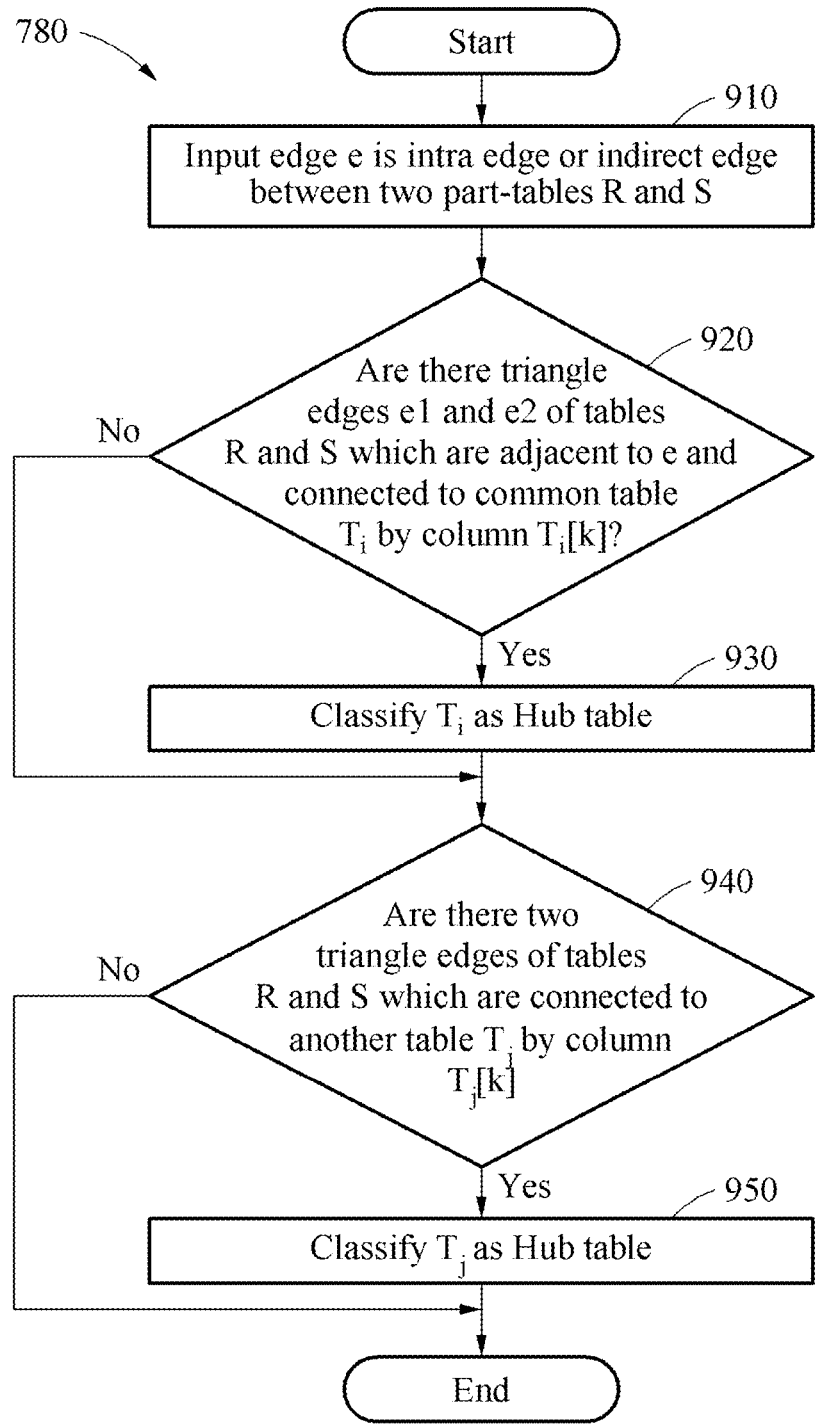
FIG. 9 is a flowchart illustrating a method of exploring a hub table according to an exemplary embodiment.

FIG. 9 is a flowchart illustrating a method of exploring a hub table according to an exemplary embodiment. Referring to FIG. 9, a process of exploring a table satisfying a hub table condition by (the hub table exploring module 126 of) the master node illustrated in FIG. 1 is illustrated. (The hub table exploring module 126 of) the master node may explore of one or more Rep-table type of tables satisfying the hub table condition for a given edge e.

When the input edge e is an intra edge or an indirect edge between Part-table type of two tables R and S in step 910, the master node may determine whether there are triangle edges e1 and e2 of the tables R and S connected to a common table Ti through a column Ti[k] in step 920.

In step 920, if there are no triangle edges e1 and e2 of the tables R and S connected to the common table Ti through the column Ti[k], the master node may determine whether there are two triangle edges connected to another table Tj through a column Tj[k] in step 940.

In step 920, when those are triangle edges e1 and e2 of the tables R and S connected to the common table Ti through the column Ti[k], the master node may classify the common table Ti as a hub table in step 930. Here, it is understood that when those are triangle edges e1 and e2 of the tables R and S connected to the common table Ti through the column Ti[k], it means that the edges e1 and e2 of the tables R and S satisfy the triangle edge condition for the column Ti[k] of the common table Ti. The common table Ti may be a Rep-table type in accordance with the triangle edge condition.

The master node may determine whether there are two triangle edges of the tables R and S connected to the column Tj[k] of another table Tj, that is, whether there are two triangle edges satisfying the triangle edge condition for the column Tj [k] of another table Tj in step 940.

In step 940, if there are two triangle edges of the tables R and S connected to the column Tj[k] of another table Tj, the master node may additionally classify another table Tj as a hub table in step 950.

In step 940, if two triangle edges of the tables R and S connected to the column Tj [k] of another table Tj do not exist, the master node may end the operation.

Figure 10:
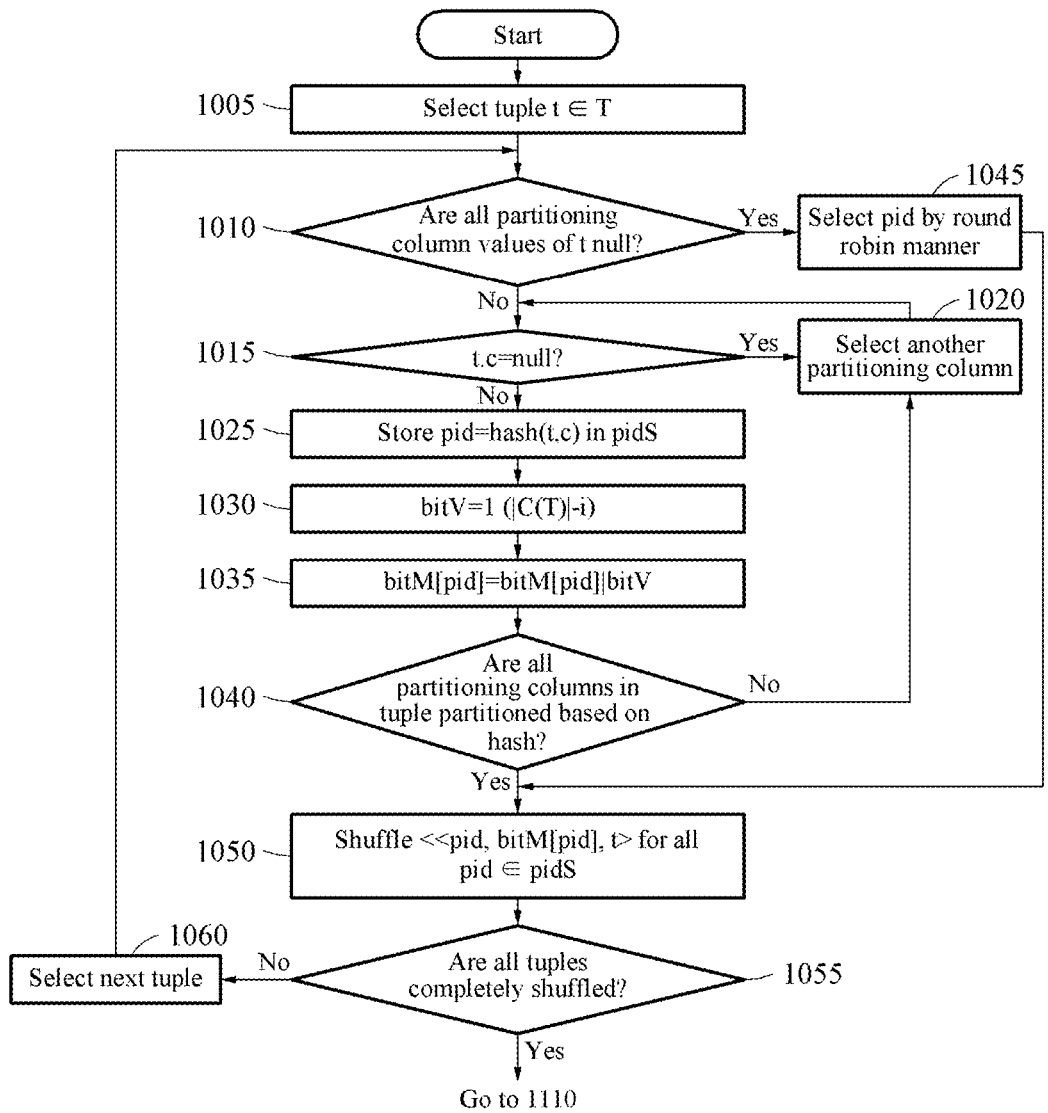
FIG. 10 is a flowchart illustrating a map operation of a data loader included in a master node according to an exemplary embodiment.

FIG. 10 is a flowchart illustrating a map operation of a data loader included in a master node according to an exemplary embodiment. Referring to FIG. 10, a process of performing table partition based on a hash function for every tuple of a given table by (a table partition storing device 130 of) the master node according to an exemplary embodiment is illustrated.

The master node may select a tuple t included in the table T in step 1005. The master node may understand partitioning column information of the table T from the data partitioning scheme.

The master node may inspect whether all partitioning column values of the tuple t selected in step 1005 are null in step 1010.

In step 1010, if all partitioning column values of the selected tuple t are null, the master node selects a partition position pid in which the tuple t is stored by a round robin manner in step 1045 and then shuffle a key-value pair <<pid, bitM[pid]>, t> with <pid, bitM[pid]> pair as a key and a tuple t as a value for all partition positions pid stored in a set pidS of a partition index in step 1050.

If all partitioning column values of the selected tuple t are not null in step 1010, the master node may determine whether only a value t.c of some partitioning column c of the tuple t is null in step 1015.

If it is determined that only a value t.c of some partitioning column c of the tuple t is null in step 1015, the master node ignores the corresponding columns c and selects another partitioning column which does not have a null value. The master node may again determine step S1015 for another partitioning column which does not have a null value.

If it is determined that only a value t.c of some partitioning column c of the tuple t is not null in step 1015, the master node determines a partition position pid in which the corresponding tuple is stored through a hash function hash( ) for the partitioning column value t.c and then stores the tuple in a set pidS of the partition position in step 1025. A partitioning method of a relational database storage system according to an exemplary embodiment may use one or more partitioning columns for partitioning the table so that the set pidS of the partition position may include one or more partition positions.

The master node may generate a bitmap vector bitV through index information i of a current partitioning column in the partitioning column set C(T) of the table T in step 1030. The bitmap vector information is used to store a tuple in a partition later.

The master node may update a bitmap vector for a tuple t to a bitmap table bitM[pid] of a pid-th partition of the table T using the bitmap vector bitV generated in step 1030.

The master node may confirm whether hash-based partitioning is performed on all partitioning columns in the tuple of the table T in step 1040. If hash-based partitioning is not performed on all partitioning columns in the tuple of the table T in step 1040, the master node may select another partitioning column in step 1020 to perform the process of steps 1015 to 1035.

If hash-based partitioning is performed on all partitioning columns in the tuple of the table T in step 1040, the master node may shuffle a key-value pair <<pid, bitM[pid]>, t> with <pid, bitM[pid]> pair as a key and a tuple t as a value for all partition positions pid stored in a set pidS of a partition index in step 1050. Here, bitM[pid] is a bitmap table of a pid-th partition and is sub partition information in which a current tuple t is stored in a bitmap vector in the table T.

The master node may confirm whether shuffling is completed for all tuples of the table T in step 1055. If shuffling is not completed for all tuples of the table T in step 1055, the master node may select a next tuple in step 1060 to perform the process of steps 1010 to 1055. The master node may repeat the above-mentioned process until all tuples are shuffled.

If shuffling is completed for all tuples of the table T in step 1055, the master node may end the operation.

Figure 11:
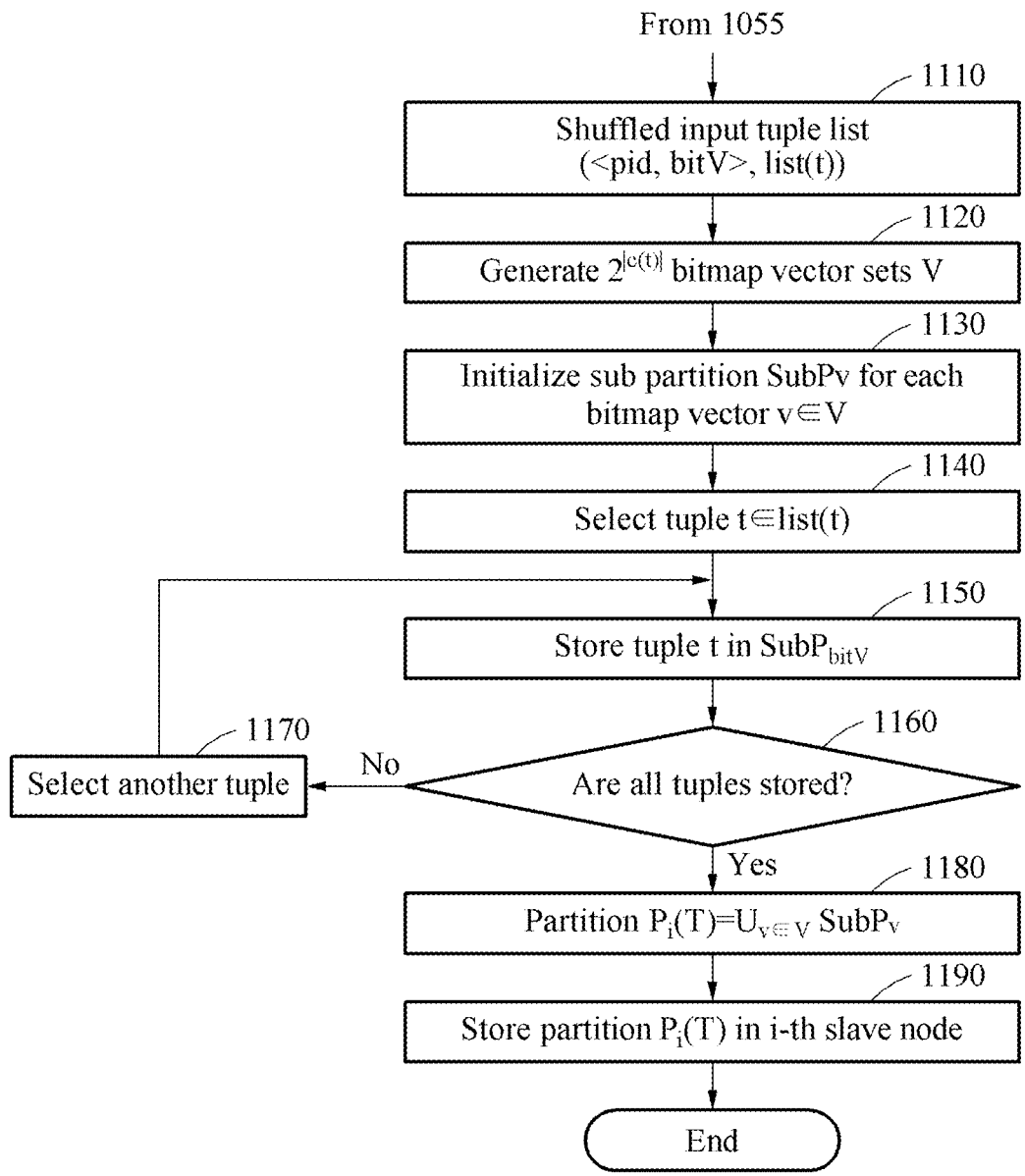
FIG. 11 is a flowchart illustrating a reduce operation of a data loader included in a master node according to an exemplary embodiment.

FIG. 11 is a flowchart illustrating a reduce operation of a data loader included in a master node according to an exemplary embodiment. Referring to FIG. 11, a process of performing a reduce operation for all tuples of the table T which are completely shuffled through FIG. 10 by (the table partition storing device 130 of) the master node is illustrated.

The master node may receive a tuple list list(t) with the same partition position pid for a bitmap vector bitV shuffled through the map process of FIG. 10 in step 1110.

The master node may generate |C(T)| bitmap vector sets V through the partitioning column information of the table T including the tuple list list(t) in step 1120. For example, when |C(T)|=2, the bitmap vector set V={00, 01, 10, 11}.

The master node may initialize a sub partition SubPV for a bitmap vector v included in the bitmap vector set V generated in step 1120 in step 1130. For example, when the bitmap vector set V={00, 01, 10, 11}, four sub partitions SubP00, SubP01, SubP10, SubP11 for the bitmap vector v included in the bitmap vector set V may be initialized.

The master node may select a tuple t included in the tuple list list(t) in step 1140.

The master node may store the selected tuple tin the sub partition SubPbitV in step 1150. In this case, the master node may store the tuple t in the sub partition SubPbitV using the bitmap vector bitV which is sub partition information in <pid, bitV> pair used as a key when the selected tuple t is shuffled.

The master node may confirm whether all tuples t in the tuple list list(t) are stored in the sub partition in step 1160. As a confirmation result of step 1160, if all the tuples t are not stored in the sub partition, the master node selects a next tuple in the tuple list list(t) in step 1170 to perform the operation of steps 1150 to 1160.

As a confirmation result of step 1160, if all the tuples t are stored in the sub partition, the master node stores all tuples in the tuple list list(t) in the sub partition SubPV and then configures the current partition Pi(T) with the union (U SubPV) of all sub partitions in step 1180.

The master node may store the database partition Pi(T) configured in step 1180 in the main memory device or the auxiliary memory device of an i-th (1≤i≤N) slave node among N slave nodes in step 1190. In this case, the database partition Pi(T) may be partitioned and stored using a sub partitioning concept. A sub partitioned database partition will be described in detail through exemplary embodiments which partition and store a table of a database illustrated in FIGS. 12 and 13.

Figure 12:
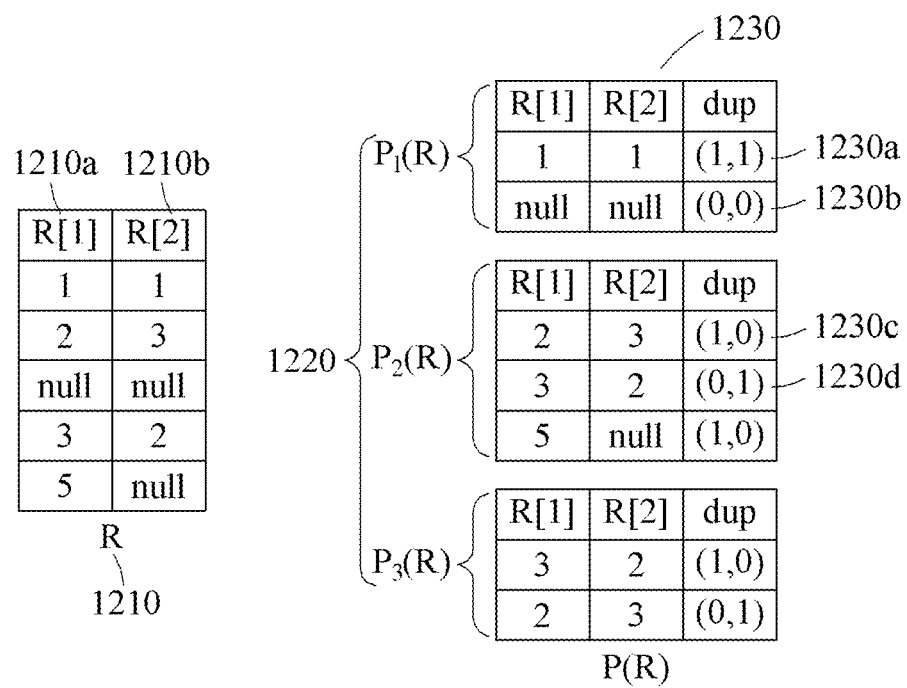
FIG. 12 is a view illustrating an example of a partition when a table is partitioned and stored using a bitmap table according to an exemplary embodiment.

FIG. 12 is a view illustrating an example of a partition when a table is partitioned and stored using a bitmap table according to an exemplary embodiment. Referring to FIG. 12, an exemplary embodiment of a partitioning and storing method of additionally storing a bitmap table in every database partition is illustrated.

Two partitioning columns R[1] 1210a and R[2] 1210b of the table R 1210 may be partitioned and stored through the above-described process of FIGS. 10 and 11.

The table R 1210 may be partitioned into a total of three partitions 1220 to be stored. In this case, since the number of partitioning column sets of the table R 1210 is |C(R)|=2, available bitmap vectors are (0,0) 1230b, (0,1) 1230d, (1,0) 1230c, and (1,1) 1230a.

A position pid of a partition in which each tuple of the table R 1210 is partitioned and stored may be determined by two partitioning column values.

For example, since all partitioning columns have the same value "1", the tuple (1,1) may be stored only in a first database partition P1(R) and the bitmap vector may be (1,1). The reason is because the tuple (1,1) stored in the database partition P1(R) is an original tuple which is not duplicated as seen from the view point of the partitioning column.

A tuple (2,3) may be stored in a second database partition P2(R) by the first partitioning column R[1] 1210a and may be stored in a third database partition P3(R) by the second partitioning column R[2] 1210b. Therefore, one duplicated tuple is additionally stored so that one bit of the bitmap vector for the tuple (2,3) may have a value of "0".

More specifically, even though a bitmap vector (1,0) 1230c of the tuple (2,3) stored in the second database partition P2(R) is (1,0) 1230c, a bitmap vector of the tuple (2,3) stored in the third database partition P3(R) may be (0,1). This difference may be used to remove a duplicated result when a query is processed using a database partition later.

For example, when the table R included in the input query uses the partitioning column R[1], a tuple having a first bit value among the bitmap vector which is "0" needs to be excluded from the query processing. Therefore, the tuple (2,3) stored in the third database partition P3(R) is not used at the time of processing the query.

As described above, the bitmap table is stored in every database partition and the bitmap table information stored at the time of query processing is utilized to perform the query processing excluding the duplicated tuple included in the database partition.

Figure 13:
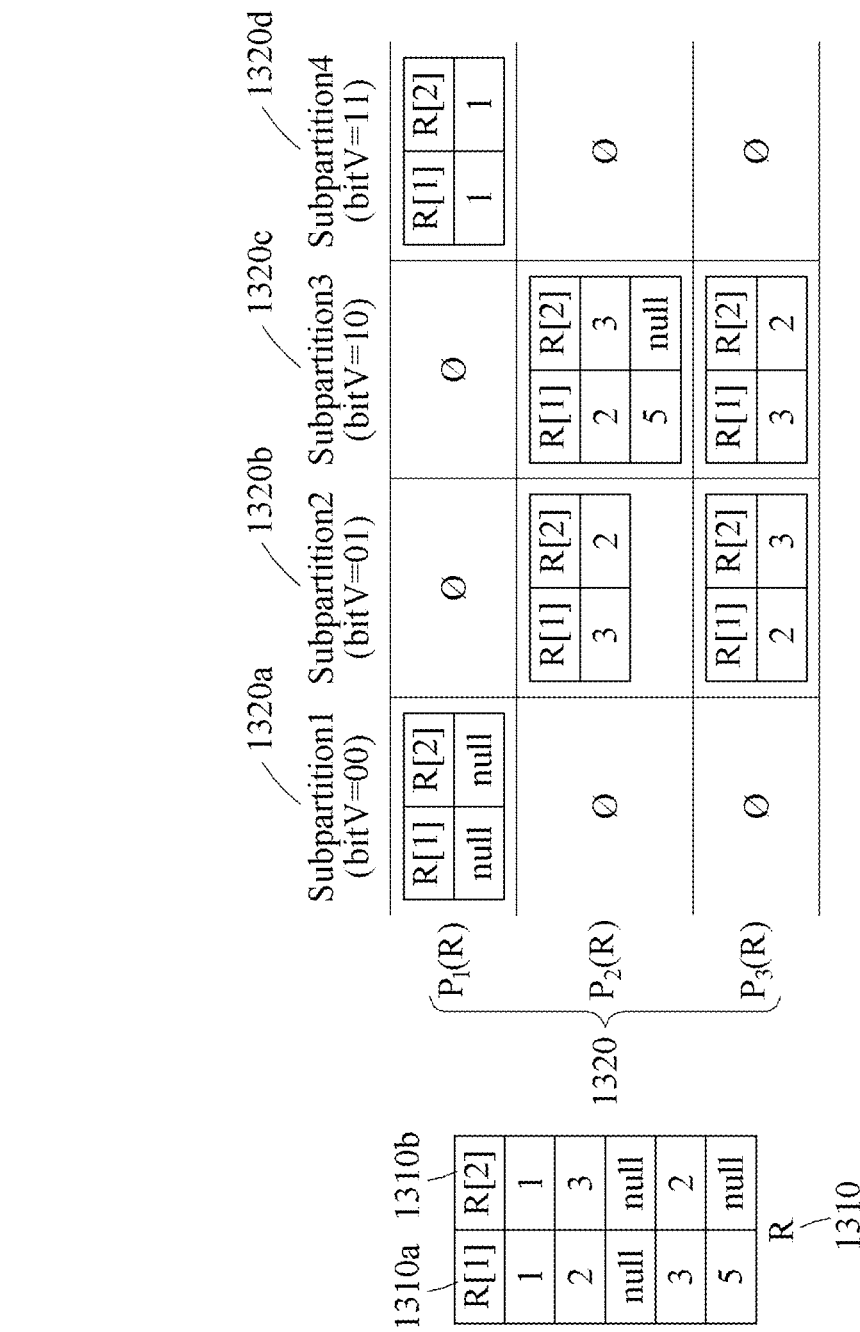
FIG. 13 is a view illustrating an example of a partition when a table is partitioned and stored by sub partitioning according to an exemplary embodiment.

FIG. 13 is a view illustrating an example of a partition when a table is partitioned and stored by sub partitioning according to an exemplary embodiment. Referring to FIG. 13, a method of partitioning and storing a table using a sub partitioning concept is illustrated.

The table R 1310 stores the same tuple as the table R 1210 of FIG. 12 and the same two partitioning columns R[1] 1310a and R[2] 1310b are provided. In this case, similarly to the exemplary embodiment of FIG. 12, it is assumed that the table R 1310 is partitioned and stored using three database partitions 1320.

In this case, since the number of partitioning column sets of the table R 1310 is |C(R)|=2, a total of four bitmap vectors {00, 01, 10, 11} may be included in the bitmap vector set.

Therefore, each database partition Pi(R) may include four sub partitions 1320a, 1320b, 1320c, and 1320d. In one exemplary embodiment, sub partitions which configure each database partition Pi(R) may represent one of four bitmap vectors.

Therefore, in the case of the tuple of the table R 1310, a position of a stored partition is determined in accordance with a partitioning column value and a sub partition of a corresponding partition to be finally stored is determined in accordance with the calculated bitmap vector.

For example, the tuple (1,1) of the table R 1310 has the same hash function value for two partitioning column values and is shuffled with the first database partition P1(R), so that no duplication is generated. Therefore, the bitmap vector may be calculated to be (1,1).

Further, since the bitmap vector of the tuple (1,1) to be stored in the first database partition P1(R) is also (1,1), the tuple may be stored in the fourth sub partition 1320d of the first database partition P1(R) which represents the bitmap vector (1,1). In this case, each sub partition does not need to separately store the bitmap table.

When the table is partitioned by the sub partitioning illustrated in FIG. 13, access to the bitmap table at the time of query processing is not necessary so that the query processing performance may be improved as compared with the table partitioning and storing method illustrated in FIG. 12.

The query processing for the table which is partitioned and stored by the table partition storing device 130 may be performed by a partitioned table reading device 140 of the master node. A method of processing a query for the partitioned and stored table by the partitioned table reading device 140 will be described with reference to FIG. 14.

Figure 14:
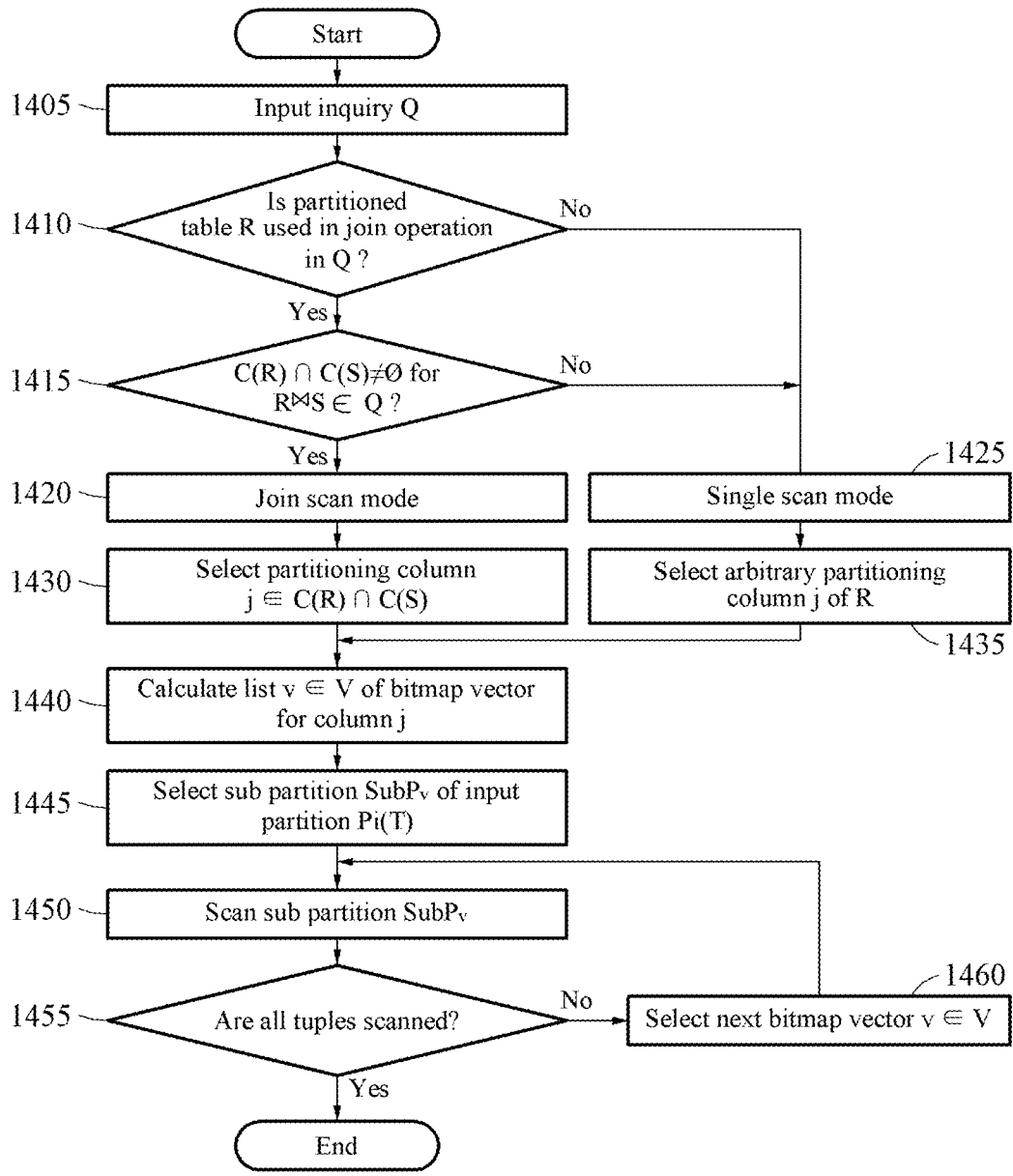
FIG. 14 is a flowchart illustrating a method of processing a query based on a relational database storing method according to an exemplary embodiment.

FIG. 14 is a flowchart illustrating a method of processing a query based on a relational database storing method according to an exemplary embodiment. Referring to FIG. 14, a process of processing a query for a partitioned and stored table through the table partition storing device 130 by (the partitioned table reading device 140 of) the master node is illustrated.

The master node may receive an input inquiry (query) Q in step 1405.

The master node may determine whether the partitioned table R is used for a join operation in an input query Q received in step 1405 and whether the table R is stored in accordance with a relational database storing method.

The master node may determine whether the table R is used for a join operation in the input query Q in step 1410. In step 1410, the master node may classify the state as one of two cases when the table R is used for the join operation in the input query Q and the table R is not used for the join operation or the input query Q does not include a join operation.

In step 1410, if the table R is not used for the join operation in the input query Q or the input query Q does not include the join operation, the master node may determine a single scan mode as a scan mode of the table R in step 1425. The master node may select an arbitrary partitioning column j among partitioning columns included in the partitioning column set C(R) of the partitioned table R in accordance with the single scan mode in step 1435.

In step 1410, if the table R is used for the join operation in the input query Q, the master node checks whether the intersection of the partition columns of the table R and the join table S is a null set through the partitioning column information of tables included in the database partitioning scheme PG in step 1415. In step 1415, if the intersection is a null set, the master node may perform steps 1425 and 1435.

In step 1415, if the intersection is not a null set, the master node may a join scan mode as a scan mode of the table R in step 1420. The master node may select one partitioning column j among one or more partitioning columns included in the intersection C(R) n C(S) of the partitioning column set of the tables R and S in accordance with the join scan mode in step 1430.

The master node may calculate a list of bitmap vectors corresponding to the partitioning column j selected in step 1430 or 1435 in step 1440. In step 1440, the master node may calculate a list V of the bitmap vector before reading the partitioned table for the partitioning column j. For example, when the number of partitioning column sets is |C(R)|=2, if the partitioning column j is the first partitioning column in C(R), the bitmap vector list may be V={10, 11}. It means that tuples which do not include the duplication of the partitioned and stored table R are stored in two sub partitions which represent the bitmap vector, using the partitioning column j.

Therefore, the master node may select a sub partition corresponding to at least one bitmap vector included in the list of the bitmap vectors in step 1445 and scan the selected sub partition in step 1450.

In step 1445, the master node may select one of sub partitions SubPv (v∈V) of the database partition Pi(R) which represents the bitmap vector included in the bitmap vector list V.

The master node may confirm whether all necessary tuples are scanned in step 1455. When all the necessary tuples are not read in step 1455, the master node may select another bitmap vector v in the bitmap vector list V in step 1460 and repeat the process of steps 1450 to 1460 until all necessary tuples are read.

When all the tuples are read in step 1455, the master node may end the operation.

The exemplary embodiments described above may be implemented by a hardware component, a software component, and/or a combination of the hardware component and the software component. For example, the device, the method, and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of processing element. For example, the processing device may include a plurality of processors or include one process and one controller. Further, another processing configuration such as a parallel processor may be allowed.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in one or more computer readable recording media.

The method according to the exemplary embodiment may be implemented as a program command which may be executed by various computers to be recorded in a computer readable medium. The computer readable medium may include solely a program command, a data file, and a data structure or a combination thereof. The program command recorded in the medium may be specifically designed or constructed for the exemplary embodiment or known to those skilled in the art of computer software to be used. An example of the computer readable recording medium includes a magnetic media, such as a hard disk, a floppy disk, and a magnetic tape, an optical media, such as a CD-ROM and a DVD, a magneto-optical media, such as a floptical disk, and a hardware device, such as a ROM, a RAM, a flash memory, specially formed to store and execute a program command. Examples of the program command include not only a machine language code which is created by a compiler but also a high level language code which may be executed by a computer using an interpreter. The hardware device may operate as one or more software modules in order to perform the operation of the exemplary embodiment and vice versa.

As described above, although exemplary embodiments have been described by limited drawings, those skilled in the art may apply various technical modifications and changes based on the above description. For example, even when the above-described techniques are performed by different order from the described method and/or components such as the system, the structure, the device, and the circuit described above are coupled or combined in a different manner from the described method or replaced or substituted with other components or equivalents, the appropriate results can be achieved.

What is claimed is:

1. A relational database storing method, comprising:
generating a join graph including tables and edges based on at least one of a database schema including information on a referential constraint condition between database tables and a query set containing join predicate information;
classifying types of tables based on a cost of a join operation between tables included in the join graph;
classifying types of edges in the join graph, based on the types of tables connected to each other by an edge;
adding a virtual edge between two tables satisfying an indirect edge condition in the join graph; and
generating a database partitioning scheme for the join graph, based on the type of edges including the virtual edge.

2. The relational database storing method of claim 1, wherein the generating of the join graph includes:
constructing an edge between tables included in the join graph using at least one of the information regarding the referential constraint condition among tables in the database schema and the join predicate in the query set.

3. The relational database storing method of claim 1, wherein the classifying of the types of tables includes:
classifying the types of tables based on a cost of a join operation between tables connected by an edge in the join graph.

4. The relational database storing method of claim 3, wherein the classifying of the types of tables further includes:
calculating a first sum of the cost of the join operations when a table is partitioned and stored in a memory device and a second sum of the cost of the join operations when a table is replicated across multiple nodes, based on a table and their adjacent tables represented in the join graph;
classifying the type of a table as either a first table type or a second table type in accordance with a comparison result between the first sum of the cost of the join operations and the second sum of the cost of the join operations; and
storing the table in accordance with the classified type of table.

5. The relational database storing method of claim 1, wherein the classifying of the types of edges includes:
classifying the type of each edge as either inter edge or intra edge, based on the type of two end tables of the edge.

6. The relational database storing method of claim 5, wherein the classifying of the type of each edge includes:
determining the type of edge as intra edge when both end tables in the edge are a first table type to each other; and
determining the type of edge as inter edge when one of the end tables in the edge is the first table type and the order end table in the edge is a second table type.

7. The relational database storing method of claim 1, wherein the adding of the virtual edge includes:
checking whether a pair of a first type of tables included in the join graph satisfies the indirect edge condition; and
adding the virtual edge between the pair of the first type of tables satisfying the indirect edge condition.

8. The relational database storing method of claim 7, wherein the indirect edge condition includes:
a first condition that a pair of two tables is connected to a third table via their own first edge of a first table of the pair of two tables and second edge of a second table of the pair of two tables;
a second condition that the same column of the third table is included in labels of both the first edge and the second edge; and
a third condition that a type of the third table be a second table type.

9. The relational database storing method of claim 1, wherein the generating of the database partitioning scheme includes:
calculating a benefit when the join operation corresponding to an edge of a table which is classified as a first table type;
sorting the edges by their benefits in descending order;
initializing a partitioned graph by adding the first table type in the join graph as nodes; and
updating the partitioned graph by processing the edges in the sorted order.

10. The relational database storing method of claim 9, wherein the type of each edge is one of the following edge types:
an intra edge, an inter edge, and an indirect edge, and
wherein the calculating of the benefit includes calculating a benefit using a benefit model corresponding to the type of each edge.

11. The relational database storing method of claim 9, wherein the updating of the partitioned graph further includes:
exploring two edges corresponding to an edge in a join graph connected via the common node where they satisfy a triangle edge condition, based on the database partitioning scheme;
classifying a table in a join graph as a hub table when edges of the join graph satisfy a hub table condition, based on the database partitioning scheme; and
adding the edge in the join graph, the explored two triangle edges, and the hub table to the partitioned graph.

12. The relational database storing method of claim 11, wherein the triangle edge condition includes:
a condition that the type of edge in the join graph is an intra edge;
a condition that there exists two intra edges where one of end table is classified as the first table type and share the other end table;
a condition that labels of the edges include a column of the same table; and
a condition that the table included in both the intra edges is a second table type.

13. The relational database storing method of claim 11, wherein the hub table condition includes a condition that there exists an edge, the type of which, is either intra edge or inter edge between two tables classified as a first table type and the two tables classified as the first table type have their own edge connected to a column of the same table classified as a second table type where these two edges satisfy the triangle edge condition.

14. The relational database storing method of claim 1, further comprises:

partitioning tuples included in the tables in the partitioning scheme based on a hash function, based on the database partitioning scheme; and storing tuples to their corresponding partitions based on information regarding their partitioning column.

15. The relational database storing method of claim 14, wherein the partitioning of the tuples includes:

determining a specific partition where a tuple is stored by applying the hash function on all partitioning columns of the tuple;

generating a bitmap vector of a tuple based on index information of its partitioning columns; and updating a bitmap table by using the generated bitmap vector of the tuple.

16. The relational database storing method of claim 14, wherein the storing of the tuple includes:

generating a set of bitmap vectors for each partition based on information regarding partitioning columns included in a shuffled list of partitioned tuples;

initializing a subpartition of corresponding bitmap vector included in the set of bitmap vectors;

storing a tuple included in the shuffled list of tuples to corresponding subpartitions based on its bitmap vectors; and constructing a partition of a table based on all generated subpartitions after finishing the storing the shuffled list of tuples to their corresponding subpartition.

17. A method of processing a query based on a relational database storing method, the method comprising:

determining whether a table is used for a join operation in an input query;

determining whether an intersection of a set of partitioning columns for two join tables is an empty set based on information regarding partitioning columns of the tables;

selecting any column in the set of partitioning columns based on a scan mode which is determined by the result of intersection of two sets of partitioning columns that the two join tables have;

calculating a set of bitmap vectors corresponding to selected partitioning column;

selecting subpartitions based on the calculated set of bitmap vectors; and scanning the selected subpartitions.

18. The method of claim 17, wherein the selecting of the any column in the set of partitioning columns includes:

determining the scan mode depending on the result of the intersection between join columns included in the query and a set of partitioning columns of the table in the query to scan the table; and selecting any partitioning column included in the intersection between a set of join columns of the input query and a set of partitioning columns of the table depending on the scan mode.

19. A non-transitory computer-readable recording medium storing computer program to cause a relational database storage system to execute a relational database storing method, wherein the relational database storing method comprises:

generating a join graph including tables and edges based on at least one of a database schema including information on a referential constraint condition between database tables and a query set containing join predicate information;

classifying types of tables based on a cost of a join operation between tables included in the join graph;

classifying types of edges in the join graph, based on the types of tables connected to each other by an edge;

adding a virtual edge between two tables satisfying an indirect edge condition in the join graph; and generating a database partitioning scheme for the join graph, based on the type of edges including the virtual edge.

* * * * *